US012783912B2

(12) United States Patent
Xu

(10) Patent No.: US 12,783,912 B2
(45) Date of Patent: Nov. 3, 2026

(54) RECOMMENDATION MODEL, DEVICE, AND STORAGE MEDIUM

(71) Applicant: Tencent Technology (Shenzhen) Company Limited, Shenzhen (CN)

(72) Inventor: Huapeng Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 649 days.

(21) Appl. No.: 18/206,026

(22) Filed: Jun. 5, 2023

(65) Prior Publication Data

US 2023/0316106 A1 Oct. 5, 2023

Related U.S. Application Data

(63) Continuation of application No. PCT/CN2022/121013, filed on Sep. 23, 2022.

(30) Foreign Application Priority Data

Nov. 9, 2021 (CN) ......................... 202111322434.X

(51) Int. Cl.

| | |
|---|---|
| ***G06N 20/00*** | (2019.01) |
| ***G06N 5/022*** | (2023.01) |
| ***G06Q 30/0251*** | (2023.01) |

(52) U.S. Cl.

CPC ......... *G06N 5/022* (2013.01); *G06Q 30/0255* (2013.01)

(58) Field of Classification Search

CPC ........ G06N 5/022; G06N 3/045; G06N 3/084; G06Q 30/0255; G06Q 30/02; G06Q 30/0251; G06Q 30/0254; G06Q 30/0269

See application file for complete search history.

(56) References Cited

U.S. PATENT DOCUMENTS

| | | | | |
|---|---|---|---|---|
| 11,042,700 | B1 * | 6/2021 | Walters | G06N 3/096 |
| 2020/0242450 | A1 | 7/2020 | Tang et al. | |

(Continued)

FOREIGN PATENT DOCUMENTS

| | | | |
|---|---|---|---|
| CN | 111310053 | A | 6/2020 |
| CN | 112507163 | A | 3/2021 |

(Continued)

OTHER PUBLICATIONS

Dai, Hanjun, et al. "Deep coevolutionary network: Embedding user and item features for recommendation." arXiv preprint arXiv:1609.03675 (2016) (Year: 2016).*

(Continued)

*Primary Examiner* — Andrew T McIntosh

(74) *Attorney, Agent, or Firm* — Morgan, Lewis & Bockius LLP

(57) ABSTRACT

This application discloses a method for training a content recommendation model performed by a computer device. The method includes: obtaining a sample data set; inputting sample data into a probability prediction model to output a probability prediction result; inputting the sample data into a duration prediction model to output a duration prediction result; determining, based on interaction data between a historical account and a historical recommendation content, probability prediction loss corresponding to the probability prediction result and duration prediction loss corresponding to the duration prediction result; and training the probability prediction model based on the probability prediction loss and the duration prediction loss to obtain the content recommendation model, the content recommendation model predicting a recommendation probability of recommending a target content to a target account. The foregoing solution improves the accuracy of a predicted probability of recommending a target content to a target account.

20 Claims, 11 Drawing Sheets

(56) References Cited

U.S. PATENT DOCUMENTS

| | | | | |
|---|---|---|---|---|
| 2020/0395001 | A1* | 12/2020 | Mohanty | G06F 16/3329 |
| 2022/0036542 | A1* | 2/2022 | Sainz de Cea | G06V 10/82 |
| 2022/0198289 | A1* | 6/2022 | Guo | G06N 3/084 |

FOREIGN PATENT DOCUMENTS

| | | | |
|---|---|---|---|
| CN | 113254792 | A | 8/2021 |
| WO | WO 2017219812 | A1 | 12/2017 |

OTHER PUBLICATIONS

Chen, Ting, et al. "Joint text embedding for personalized content-based recommendation." arXiv preprint arXiv:1706.01084 (2017) (Year: 2017).*

Zhu, Ziwei, et al. "Unbiased implicit recommendation and propensity estimation via combinational joint learning." Proceedings of the 14th ACM conference on recommender systems. 2020 (Year: 2020).*

Tencent Technology, WO, PCT/CN2022/121013, Nov. 29, 2022, 4 pgs.

Tencent Technology, ISR, PCT/CN2022/121013, Nov. 29, 2022, 2 pgs.

Zhong Zhao et al., "Distillation Based Multi-Task Learning: A Candidate Generation Model for Improving Reading Duration", arXiv.org, Feb. 2021, 5 pgs., https://arxiv.org/abs/2102.07142.

* cited by examiner

RECOMMENDATION MODEL, DEVICE, AND STORAGE MEDIUM

CROSS-REFERENCE TO RELATED APPLICATIONS

This application is a continuation application of PCT Patent Application No. PCT/CN2022/121013, entitled "CONTENT RECOMMENDATION METHOD AND APPARATUS, DEVICE, STORAGE MEDIUM, AND COMPUTER PROGRAM PRODUCT" filed on Sep. 23, 2022, which claims priority to Chinese Patent Application No. 202111322434.X, filed on Nov. 9, 2021 and entitled "CONTENT RECOMMENDATION METHOD AND APPARATUS, DEVICE, STORAGE MEDIUM, AND COMPUTER PROGRAM PRODUCT", all of which is incorporated herein by reference in its entirety.

FIELD OF THE TECHNOLOGY

This application relates to the field of Internet technologies, and in particular, to a method and an apparatus for training a content recommendation model, a device, and a storage medium.

BACKGROUND OF THE DISCLOSURE

With the continuous development of Internet technologies, the speed of information dissemination has been greatly increased. When a user runs an application on a terminal, recommendation contents, such as advertisements and posters, are often displayed on a terminal interface, so that the user can quickly know and learn relevant information or products in the recommendation content. Therefore, content recommendation is a key means for some manufacturers or businesses to improve publicity.

In the related art, taking advertisement content recommendation as an example, click-through rate prediction is generally performed based on whether a user has historical click behavior on advertisements, then the advertisements are ranked according to click-through rate prediction results, and a top ranked advertisement is recommended to the user.

However, in the related art, predicting based on whether the user has click behavior on the advertisements is essentially a binary classification issue. A click-through rate prediction model constructed based on the related art has a simple structure, and the accuracy of prediction results still needs to be improved.

SUMMARY

Embodiments of this application provide a method and an apparatus for training a content recommendation model, a device, and a storage medium, to measurement accuracy of the content recommendation model. The technical solutions are as follows.

According to one aspect, a method for training a content recommendation model is provided. The method includes:

- obtaining a sample data set, the sample data set including a historical account and a historical recommendation content, and interaction data between the historical account and the historical recommendation content being labeled;
- inputting the sample data set into a probability prediction model to output a probability prediction result, the probability prediction result indicating a predicted probability of the historical account selecting the historical recommendation content;

- inputting the sample data set into a duration prediction model to output a duration prediction result, the duration prediction result indicating predicted duration for which the historical account views the historical recommendation content;
- determining probability prediction loss corresponding to the probability prediction result and duration prediction loss corresponding to the duration prediction result; and
- training the probability prediction model based on the probability prediction loss and the duration prediction loss to obtain the content recommendation model, the content recommendation model predicting a recommendation probability of recommending a target content to a target account.

According to another aspect, a content recommendation method is provided. The method includes:

- obtaining target account information and information about n target contents, n being a positive integer;
- inputting, for an $i^{th}$ target content in the n target contents, the target account information and the information about the $i^{th}$ target content into the content recommendation model to obtain a recommendation probability corresponding to the $i^{th}$ target content; and
- determining a target content with the recommendation probability satisfying a condition in the n target contents as a recommendation content.

According to another aspect, a computer device is provided. The computer device includes a processor and a memory. The memory stores at least one instruction, at least one program, a code set or an instruction set. The at least one instruction, the at least one program, the code set or the instruction set is loaded and executed by the processor to implement the method for training a content recommendation model according to any one of the foregoing embodiments of this application.

According to another aspect, a non-transitory computer-readable storage medium is provided. The storage medium stores at least one instruction, at least one program, a code set or an instruction set. The at least one instruction, the at least one program, the code set or the instruction set is loaded and executed by a processor of a computer device and causes the computer device to implement the method for training a content recommendation model according to any one of the foregoing embodiments of this application.

The technical solutions provided in the embodiments of this application have at least the following beneficial effects:

In a process of training the content recommendation model, the duration prediction model is used based on the probability prediction model for joint training. During training the probability prediction model with the assistance of the duration prediction model, the historical account and the historical recommendation content in the sample data set are inputted into both the duration prediction model and the probability prediction model as sample data, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. The method for obtaining the content recommendation model provided in this application can improve the prediction accuracy of the probability prediction result outputted by the model, so as to recommend more appropriate content to users in content marketing, thereby increasing the degree of recommendation matching degree and improving the publicity effect of the recommended content.

DESCRIPTION OF EMBODIMENTS

Figure 1:
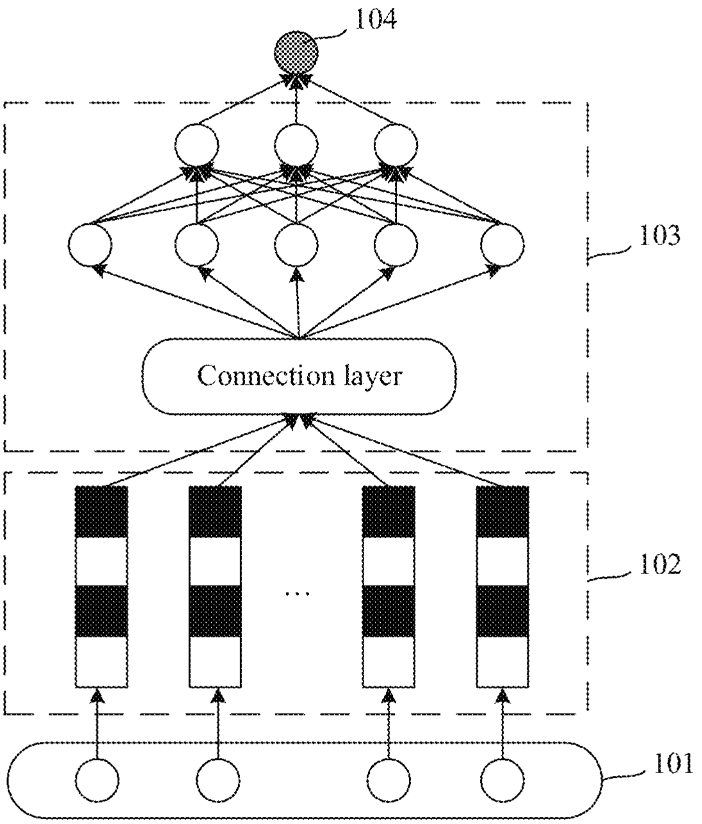
FIG. 1 is a schematic diagram of determining an advertising recommendation content based on account information according to an exemplary embodiment of this application.

First, a brief introduction to terms involved in embodiments of this application is given below.

Artificial intelligence (AI) involves a theory, a method, a technology, and an application system that use a digital computer or a machine controlled by the digital computer to simulate, extend, and expand human intelligence, perceive an environment, obtain knowledge, and use knowledge to obtain an optimal result. In other words, artificial intelligence is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The artificial intelligence technology is a comprehensive discipline, and relates to a wide range of fields including both hardware-level technologies and software-level technologies. Basic artificial intelligence technologies generally include technologies such as a sensor, a dedicated artificial intelligence chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

Machine learning (ML) is a multi-field interdiscipline, and relates to a plurality of disciplines such as the probability theory, statistics, the approximation theory, convex analysis, and the algorithm complexity theory. Machine learning specializes in studying how a computer simulates or implements a human learning behavior to obtain new knowledge or skills, and reorganize an existing knowledge structure, so as to keep improving its performance. Machine learning is the core of artificial intelligence, is a basic way to make the computer intelligent, and is applied to various fields of artificial intelligence. Machine learning and deep learning generally include technologies such as an artificial neural network, a belief network, reinforcement learning, transfer learning, inductive learning, and learning from demonstrations.

AdExchange (ADX) is a platform where a certain connection is created between a media owner and an advertiser, and allows advertisements of advertisers to be put on advertising spaces provided by the media owner. To accurately deliver the advertisements of the advertisers to target audience, the AdExchange generally collects user information to create user profiles, so as to accurately deliver the advertisements according to interests, geographical locations, or other data of users.

Click-through rate (CTR) refers to the click-through rate of an online advertisement, that is, an actual quantity of clicks on the advertisement divided by a quantity of impressions of the advertisement. The click-through rate is an important indicator for measuring the effectiveness of Internet advertising. In this application, a trigger operation of a user on a historical recommendation content displayed on a terminal interface is regarded as a click behavior.

Conversion link refers to behavior of a user on an advertising platform. For example, for an APP advertisement, download, activation, payment, and other behavior links are called conversion links.

Predicted click-through rate (pCTR) corresponds to the CTR, is a probability of an advertisement that is delivered under a certain situation being clicked predicted by an online advertising system, and is an important part of a ranking model.

Conversion rate (CVR) is a metric for measuring the effectiveness of advertising, and refers to the proportion of users who click on an advertisement and into users who effectively activate an account, register an account, or become a paying user, that is, an actual quantity of conversions for the advertisement divided by a quantity of clicks on the advertisement.

Deep conversion rate (dCVR) is a metric for measuring the effectiveness of advertising, and refers to the proportion of paying users converted from users who has obtained a valid activation account by clicking on an advertisement, that is, an actual quantity of payment conversions divided by a quantity of activation conversions for the advertisement.

Predicted conversion rate (pCVR) is the probability of conversion for an advertisement clicked under a certain situation predicted by an online advertising system, and is an important part of a ranking model.

Double-goal bid means advertising based on two optimization goals. The first optimization goal represents a shallow optimization goal, and the second goal represents a deep optimization goal. Moreover, a certain behavioral sequence relationship exists between user conversion behaviors corresponding to the first objective and the second objective.

Cost per mille (CPM) refers to a cost to be paid for displaying an advertisement to a thousand visiting users on an Internet platform.

Bid refers to the price of an advertising bidding, and is generally the price of a conversion in oCPM.

Optimized cost per mille (oCPM) indicates a charging mode similar to the cost per mille, except the value of each user for an advertisement is determined by AdExchange. In this mode, AdExchange optimizes benefits of advertising according to set conversion goals and costs corresponding to an advertisement, and achieves the goals as efficiently as possible. A charge per thousand impressions of an advertisement is positively correlated with a real-time bid of the advertisement, where the real-time cost per mille eCPM for the advertisement is:

$$eCPM=\text{Bid}\times pCTR\times pCVR.$$

In the related art, in a method of determining a target content to be recommended to a user account, recommendation prediction analysis on the target content is generally performed based on historical triggering corresponding to the target content. A description is provided by taking an advertisement content recommendation scenario as an example. For example, FIG. 1 shows a schematic diagram of determining an advertising recommendation content based on account information according to an exemplary embodiment of this application. As shown in FIG. 1, a target data set is obtained. The target data set includes related attribute information of an account of a user, such as age, gender, interests, historical view records, and search preferences of the user corresponding to the account. The related attribute information is used as target data. Data features 101 corresponding to the target data are extracted, corresponding feature vectors 102 are determined based on the data features 101, and the feature vectors 102 are input into a probability prediction model 103 to output probability prediction results 104 corresponding to to-be-recommended advertisements. The probability prediction results 104 are used for indicating predicted click-through rates corresponding to the to-be-recommended advertisements, the predicted click-through rates for the to-be-recommended advertisements are ranked, and a related advertisement content is recommended based on a ranking result and the account attribute information corresponding to the user.

An embodiment of this application provides a method for training a content recommendation model. In a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. The method for obtaining the content recommendation model provided in this application can improve the prediction accuracy of the probability prediction result outputted by the model, so as to recommend more appropriate content to users in content marketing, thereby increasing the degree of recommendation matching degree and improving the publicity effect of the recommended content.

Figure 2:
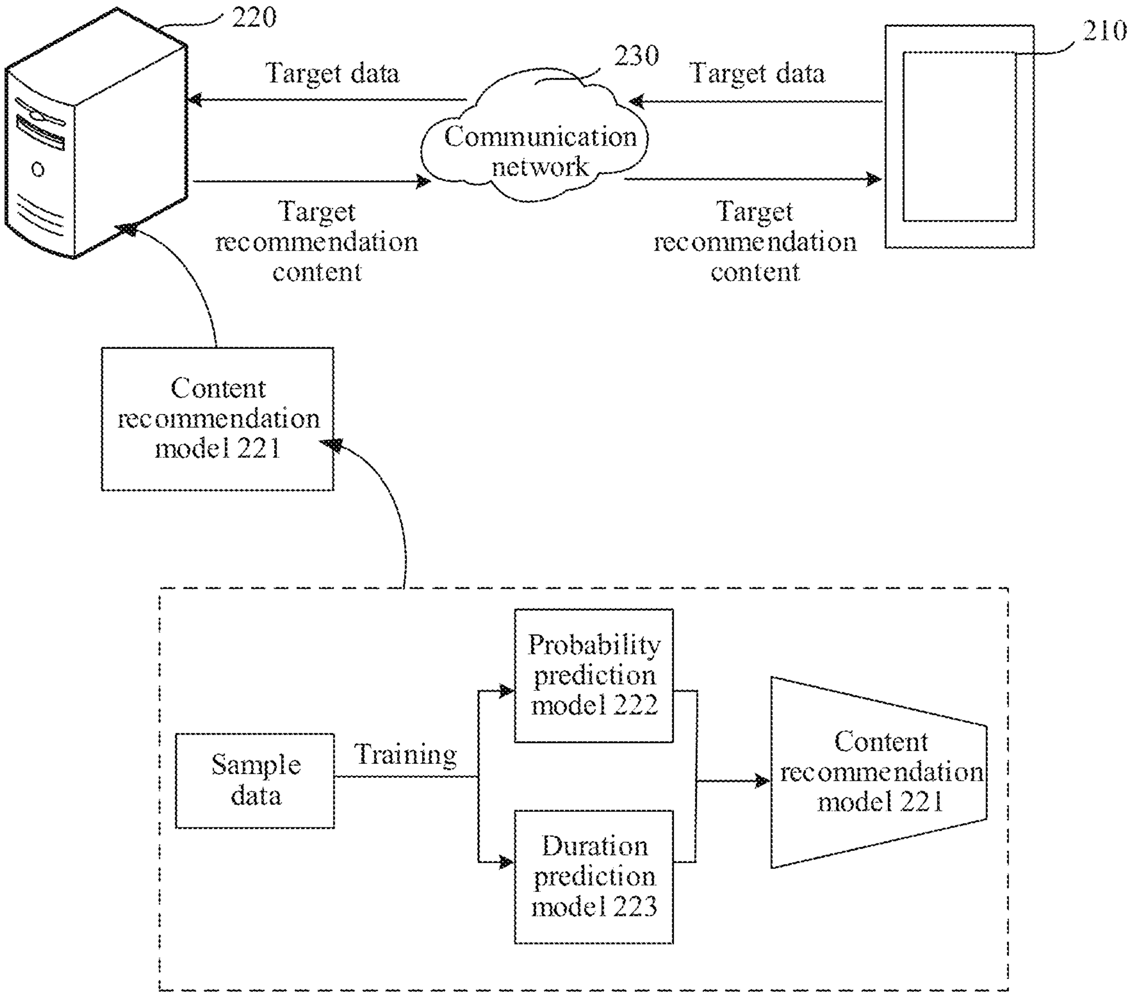
FIG. 2 is a schematic diagram of an implementation environment according to an exemplary embodiment of this application.

In addition, an implementation environment involved in the embodiment of this application is described. For example, referring to FIG. 2, the implementation environment includes a terminal device 210 and a server 220. The terminal device 210 and the server 220 are connected through a communication network 230.

In some embodiments, the terminal 210 is configured to send target data to the server 220. The target data includes a target account and target contents. In some embodiments, an application having a recommendation function is installed in the terminal 210. For example, a search engine program, an instant messaging application, a shopping program, a video playback program, and an audio playback program are installed in the terminal 210. This is not limited in the embodiments of this application.

The server 220 includes a content recommendation model. The server 220 predicts, through the content recommendation model, probability prediction results corresponding to the target contents, ranks the target contents according to the probability prediction results, outputs a target recommendation content based on a ranking list, and feeds the target recommendation content back to the terminal 210 for display.

A content recommendation model 221 is trained through sample data in a sample data set. The sample data set is obtained. The sample data included in the sample data set is respectively inputted into a probability prediction model 222 and a duration prediction model 223, to obtain a corresponding probability prediction result and a duration prediction result, respectively. Probability prediction loss corresponding to the probability prediction result and duration prediction loss corresponding to the duration prediction result are obtained based on interaction data included in the sample data. The probability prediction loss and the duration prediction loss are fused to obtain prediction loss. The probability prediction model 222 is trained through the prediction loss to consequently obtain the content recommendation model 221.

The terminal 210 may be a smart phone, a wearable device, a tablet computer, a desktop computer, a portable notebook computer, a smart TV, a smart vehicle, and other forms of terminal device. This is not limited in the embodiments of this application.

The server refers to an independent physical server, a server cluster or distributed system composed of multiple physical servers, and a cloud server providing basic cloud computing services, such as cloud services, cloud databases, cloud computing, cloud functions, network services, cloud communications, middleware services, domain name services, security services, Content Delivery Networks (CDN), big data and artificial intelligence platforms.

Cloud technology refers to a hosting technology that integrates resources, such as hardware, software, and networks, to implement data computing, storage, processing and sharing in a wide area network or local area network. Cloud technology is a general term of network technologies, information technologies, integration technologies, management platform technologies, application technologies and other technologies applied to a cloud computing business model, and creates a resource pool to satisfy what is needed in a flexible and convenient manner. Cloud computing technologies may be the backbone. A lot of computing resources and storage resources are needed for background services in a technical network system, such as video websites, picture websites and more portal websites. With advanced development and application of the Internet industry, each object is likely to have a recognition flag. These flags need to be transmitted to a background system for logical processing, and data at different levels may be processed separately. Therefore, data processing in all industries requires a strong system to support, and is implemented only through cloud computing technologies.

In some embodiments, the servers may also be implemented as nodes in a blockchain system. Blockchain is a new application mode of computer technologies, such as distributed data storage, peer-to-peer transmission, consensus mechanism and encryption algorithm. Blockchain is essentially a decentralized database or a string of data blocks produced by employing cryptographic methods. Each data block contains a batch of network transaction information to verify information validity (anti-counterfeiting) and generate a next block. Blockchain includes a blockchain underlying platform, a platform product service layer, and an application service layer.

The content recommendation model trained in this application is applied to at least one of the following scenarios:

1. A scenario of recommending a content to a user. For example, when the user uses a related application, a target account of the user in the application and a target content. For example, age and interests of the user and historical recommendation data of the target content are obtained, and feature extraction is performed on the data to obtain target features. The target features are inputted into the content recommendation model for probability prediction analysis to obtain a predicted click-through rate and a predicted conversion rate based on the user and corresponding to the target content. The predicted click-through rate and the predicted conversion rate corresponding to at least one target content are ranked. A top-ranked target content is selected for content recommendation to the user. The recommendation form is a poster, an advertisement, etc. The recommendation content includes a text content, a video content, an audio content, and the like. This is not limited herein.

2. A retrieval scenario. For example, when using a search engine having a search function, a user inputs a target question statement. A server obtains account information (for example, search preferences) corresponding to the user in the search engine during identifying an answer result corresponding to the target question statement, and historical search information of an answer content related to the answer result (for example, a historical search frequency). A corresponding feature is extracted and inputted into the content recommendation model for probabilistic prediction analysis to obtain a predicted click-through rate corresponding to the answer result. The predicted click-through rate corresponding to at least one answer content is ranked, and the answer content is recommended while feeding the answer result back to the user according to an actual requirement, so that the user can quickly know related contents during retrieval.

3. An online shopping scenario. For example, when the user selects and purchases goods on an online shopping program, historical purchase records (for example, purchase preferences) corresponding to the user and information of a target product (for example, sales records corresponding to the target product). Features are extracted from the historical purchase records and the information of the target product and inputted into the content recommendation model for probabilistic prediction information, to obtain a predicted selling probability corresponding to the target product based on the user. The predicted selling probability corresponding to at least one target product is ranked, and a top-ranked target product is selected for recommendation and display in a display interface of the shopping program corresponding to the user.

The above application scenarios are merely examples. The method for training a content recommendation model provided in the embodiments of this application may also be applied to other scenarios, for example, to recommend related routes in smart transportation. This is not limited in the embodiments of this application.

Figure 3:
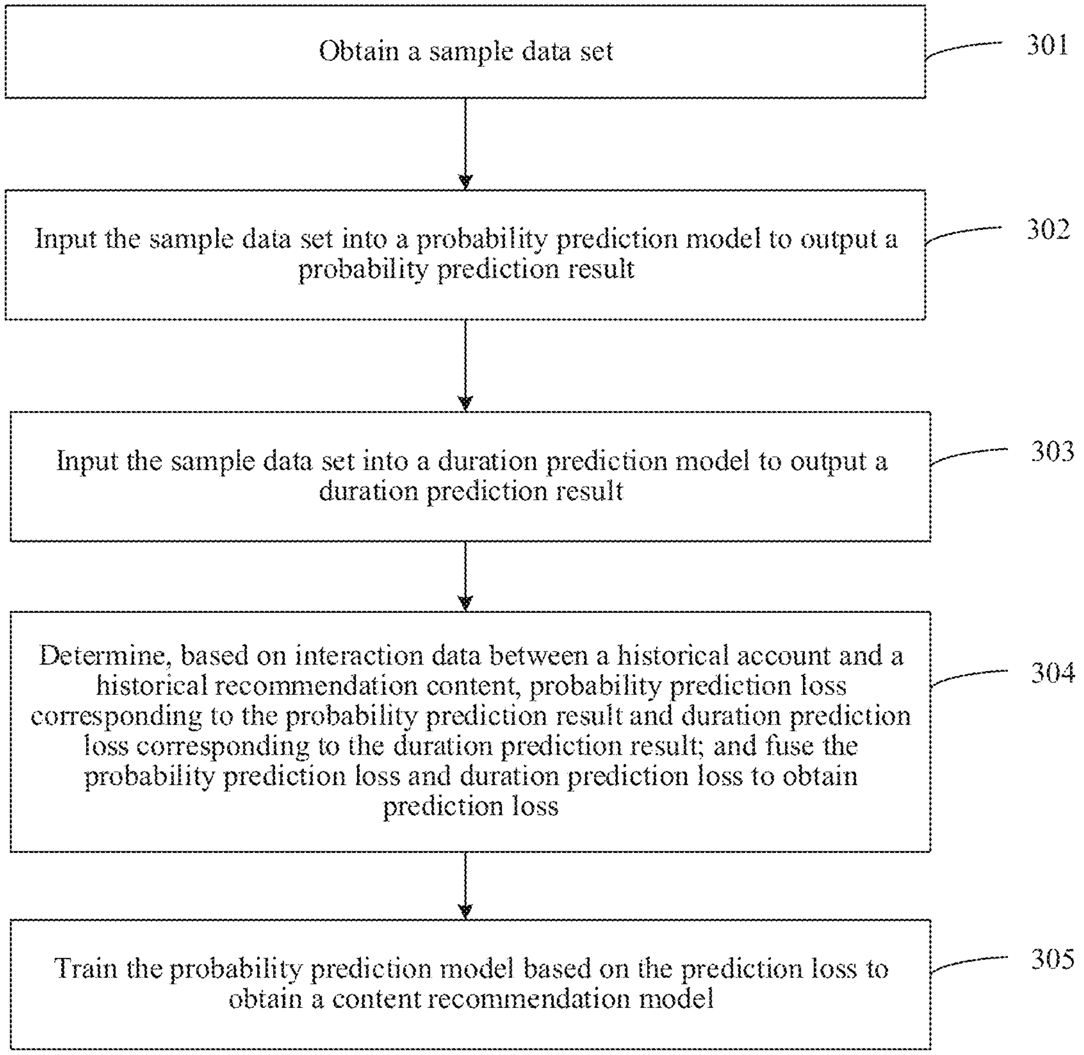
FIG. 3 is a flowchart of a method for training a content recommendation model according to an exemplary embodiment of this application.

The method for training a content recommendation model provided in this application is described in combination with the term introduction above and application scenarios. The method may be executed by the server or the terminal, or jointly executed by the server and the terminal. In an embodiment of this application, description is provided by taking the method being executed by the server as an example. As shown in FIG. 3, the method includes the following steps:

Step 301: Obtain a sample data set.

Sample data in the sample data set includes a historical account and a historical recommendation content, and interaction data between the historical account and the historical recommendation content is labeled.

For example, the sample data set includes different types of data, such as account information data corresponding to the historical account, content data corresponding to the historical recommendation content, and historical recommendation data.

In some embodiments, the historical account includes a user account. Account information data corresponding to the user account includes related information registered when the user creates the account, such as the age, gender, preferences, region, or education background of the user, and the historical account includes at least one historical view record corresponding to the historical recommendation content, such as a record of a web page, an image, an audio, or a text viewed. This is not limited herein.

It may be understood that in specific implementations of this application, the age, gender, preferences, region, education background, or other related data of users is used. When the foregoing embodiments of this application are applied to specific products or technologies, permission or consent of users is required. Moreover, collection, use, and processing of the related data need to comply with related laws, regulations, and standards of related countries and regions.

In some embodiments, the historical recommendation content is used for recommending and displaying to the user, to achieve a purpose of publicity or to carry out related promotion, etc. A content form of the historical recommendation content includes at least one of the following forms:

1. The historical recommendation content includes a text content, which is displayed on the terminal in a text form when recommended and displayed to the user.

2. The historical recommendation content includes a video content, which is displayed on the terminal in a video form, such a video advertisement, when recommended and displayed to the user.

3. The historical recommendation content includes an audio content, which is displayed on the terminal in an audio form, such as music clip audition playback, when recommended and displayed to the user.

4. The historical recommendation content includes an image content, which is displayed on the terminal in an image form, such as poster image publicity, when recommended and displayed to the user.

The foregoing forms of the historical recommendation content are merely examples. The specific form of the historical recommendation content is not limited in the embodiments of this application.

In some embodiments, when the historical recommendation content includes the text content, the sample data set includes a text statement relationship corresponding to the text content; or when the historical recommendation content includes the video content, the sample data set includes a sequential relationship among video frames corresponding to the video content; or when the historical recommendation content includes the image content, the sample data set includes a corresponding a pixel point distribution relationship in the image content; or when the historical recommendation content includes the audio content, the sample data set includes a sequential relationship among audio frames corresponding to the audio content. This is not limited herein.

For example, historical recommendation data corresponding to the historical recommendation content includes historical recommendation information corresponding to the historical recommendation content, where the historical recommendation information includes at least one of the following information:

1. A historical exposure rate of the historical recommendation content, that is, the number of times the historical recommendation content is recommended and displayed on terminals of one or more users.

2. A historical click-through rate of the historical recommendation content, that is, triggering of the historical recommendation content by a user when the historical recommendation content is recommended and displayed on terminals of one or more users.

3. A historical conversion rate of the historical recommendation content. That is, when the historical recommendation content is recommended and displayed on terminals of one or more users, the users perform subsequent operations based on the historical recommendation content. For example, the historical recommendation content is used for recommending a product, and users purchase the product after viewing the historical recommendation content on the terminals.

4. Historical view duration distribution of the historical recommendation content, that is, time distribution of a specific content displayed after a user triggers the historical recommendation content that is recommended and displayed on terminals of one or more users. For example, corresponding duration for which users view the historical recommendation content is generally five seconds. As the duration increases, a quantity of users viewing the historical recommendation content decreases relatively.

The foregoing historical recommendation information corresponding to the historical recommendation data are merely examples. The historical recommendation information is not specifically limited in the embodiments of this application.

In some embodiments, the labeled interaction data between the historical account and the historical recommendation content is data corresponding to interaction between the historical account and the historical recommendation content.

In some embodiments, the interaction data includes historical triggering and historical view duration. The historical triggering refers to triggering of historical recommendation content by the historical account; The historical view duration refers to view duration of the historical recommendation content by the historical account when there is a trigger event between the historical account and the historical recommendation content.

For example, there is a historical interaction between the historical account and the historical recommendation content or not. When there is a historical interaction, that is, the historical account has a historical view record corresponding to the historical recommendation content. The historical view record includes the historical triggering and the historical view duration. The historical triggering includes a case where the historical account triggers the historical recommendation content, and the historical view duration includes the corresponding view duration of viewing the historical recommendation content when the historical account triggers the historical recommendation content. Therefore, the historical triggering and the historical view duration are used as the labeled interaction data between the historical account and the historical recommendation content.

In some embodiments, one historical recommendation content includes same or different labeled interaction data with one or more historical accounts, and a historical account includes interactions (including a trigger operation, content viewing, or other subsequent operations) on one or more historical recommendation contents. This is not limited herein.

Step 302: Input the sample data set into a probability prediction model to output a probability prediction result.

The probability prediction result is used for indicating a predicted probability of the historical account selecting the historical recommendation content. The probability prediction model is used for predicting, during training, a probability of the historical account selecting the historical recommendation content.

In some embodiments, the probability prediction model analyzes the historical recommendation content through inputted sample data to predict a probability of the user triggering the historical recommendation content during content recommendation to the user. A trigger method includes a tap operation, slide operation, long press operation on a displayed historical recommendation content by the user on a terminal interface, or a motion control operation (such as "shake") on the terminal, etc. This is not limited herein.

The probability prediction model analyzes the historical recommendation content through the sample data. For example, an analysis method includes, for example, the server analyzes a matching degree based on the account information corresponding to the historical account and the content data corresponding to the historical recommendation content. For example, matching is performed between user preferences with content types included in the historical recommendation content, and the probability prediction result of the historical recommendation content is determined based on the matching degree.

In some embodiments, the probability prediction result includes a predicted probability value of the historical account selecting the historical recommendation content. Alternatively, the probability prediction result is a binary classification set, that is, according to the prediction, the historical account corresponding to the user is to trigger or not trigger the historical recommendation content. This is not limited herein.

Step 303: Input the sample data set into a duration prediction model to output a duration prediction result.

The duration prediction result is used for indicating predicted duration for which the historical account views the historical recommendation content.

The duration prediction model is used for predicting, during training, duration for which the historical account views the historical recommendation content when the historical account triggers the historical recommendation content. In other words, in this application, information in such dimension, i.e., view duration, is used during training the probability prediction model, so as to make the predicted probability of the historical account selecting the historical recommendation content more accurate.

In some embodiments, the duration prediction model analyzes the historical recommendation content through the inputted sample data to predict the corresponding view duration for which the user views the historical recommendation content during content recommendation to the user. The duration prediction result includes a view duration value, for example, the view duration is 3 seconds or 5 seconds; or a view duration range, for example, the view duration is 3 seconds to 5 seconds; or a probability value corresponding to the view duration, for example, The probability value of that the view duration is 3 seconds is 10%, and the probability value of that the view duration is 5 seconds is 5%. This is not limited herein.

The duration prediction model analyzes the historical recommendation content through the sample data. For example, the analysis method includes at least one of the following methods:

1. calculating an average duration corresponding to at least one historical view duration corresponding to the historical recommendation content, and using the average duration as the duration prediction result;
2. establishing a historical view duration distribution chart corresponding to the historical recommendation content, and using at least one historical view duration having the highest proportion in the historical view duration distribution chart as the duration prediction result; and
3. matching and analyzing the sample data of the historical account and the historical recommendation content, setting a matching degree threshold, and if a matching result reaches matching degree threshold, using the view duration corresponding to the historical view record included in the historical account as the duration prediction result corresponding to the historical recommendation content.

The foregoing analysis forms of the duration prediction model are merely examples. The specific analysis forms of the duration prediction model are not limited in the embodiments of this application.

Step 304: Determine, based on the interaction data between the historical account and the historical recommendation content, probability prediction loss corresponding to the probability prediction result and duration prediction loss corresponding to the duration prediction result; and, in some embodiments, fuse the probability prediction loss and duration prediction loss to obtain prediction loss.

For example, calculation is performed based on the probability prediction result of the historical recommendation content and a historical selection relationship corresponding to the historical recommendation content to obtain the probability prediction loss corresponding to the probability prediction model; and calculation is performed based on the duration prediction result of the historical recommendation content and the historical view duration corresponding to the historical recommendation content to obtain the duration prediction loss corresponding to the duration prediction result, where the probability prediction loss is used for indicating difference between the probability prediction result and the historical triggering, and the duration prediction loss is used for indicating difference between the duration prediction result and the historical view duration.

In some embodiments, the probability prediction loss and the duration prediction loss are fused to obtain the predicted loss, where a fusion method includes adding the probability prediction loss with the duration prediction loss, and taking a sum result as the predicted loss; or a weighted sum or a weighted average sum of the probability prediction loss and the duration prediction loss is calculated, and a weighted sum result or a weighted average sum result is taken as the prediction loss. This is not limited herein.

Step 305: Train the probability prediction model based on the prediction loss to obtain the content recommendation model.

The content recommendation model is used for predicting a recommendation probability of recommending a target content to a target account.

For example, model parameters of the probability prediction model are adjusted through the prediction loss. In some embodiments, model parameters corresponding to the probability prediction result are adjusted, and are taken as model parameters corresponding to the content recommendation model; or model parameters corresponding to the duration prediction result are adjusted, and are taken as model parameters corresponding to the content recommendation model; or both the model parameters corresponding to the probability prediction result and the model parameters corresponding to the duration prediction result are adjusted, and taken as model parameters corresponding to the content recommendation model. This is not limited herein.

In some embodiments, the content recommendation model is used for predicting the recommendation probability of the target content. The prediction content includes at least one of the following contents:

1. Content data corresponding to the target content is matched with account information corresponding to the target account, and a matching degree is determined as the recommendation probability of recommending the target content to the target account.

2. Recommendation data corresponding to the target content is analyzed, and an analysis result is taken as the recommendation probability of the target content. For example, a predicted click-through rate of the target content is determined based on a click-through rate, conversion rate, and the like of the target content.

The foregoing prediction contents are merely examples, and the specific prediction contents are not limited in the embodiments of this application.

For example, the recommendation probability includes a predicted click-through rate, a predict exposure rate, a predict matching rate (i.e., a matching degree of the target content with the target account), and predicted view duration. This is not limited herein.

To sum up, the embodiments of this application provide a method for training a content recommendation model. In a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. Consequently, the method for training the content recommendation model is obtained, to improve the prediction accuracy of the probability prediction result in the model, so as to recommend more appropriate contents to the user during content marketing and improve a recommendation matching degree, thereby improving the publicity effect of recommended content.

Figure 4:
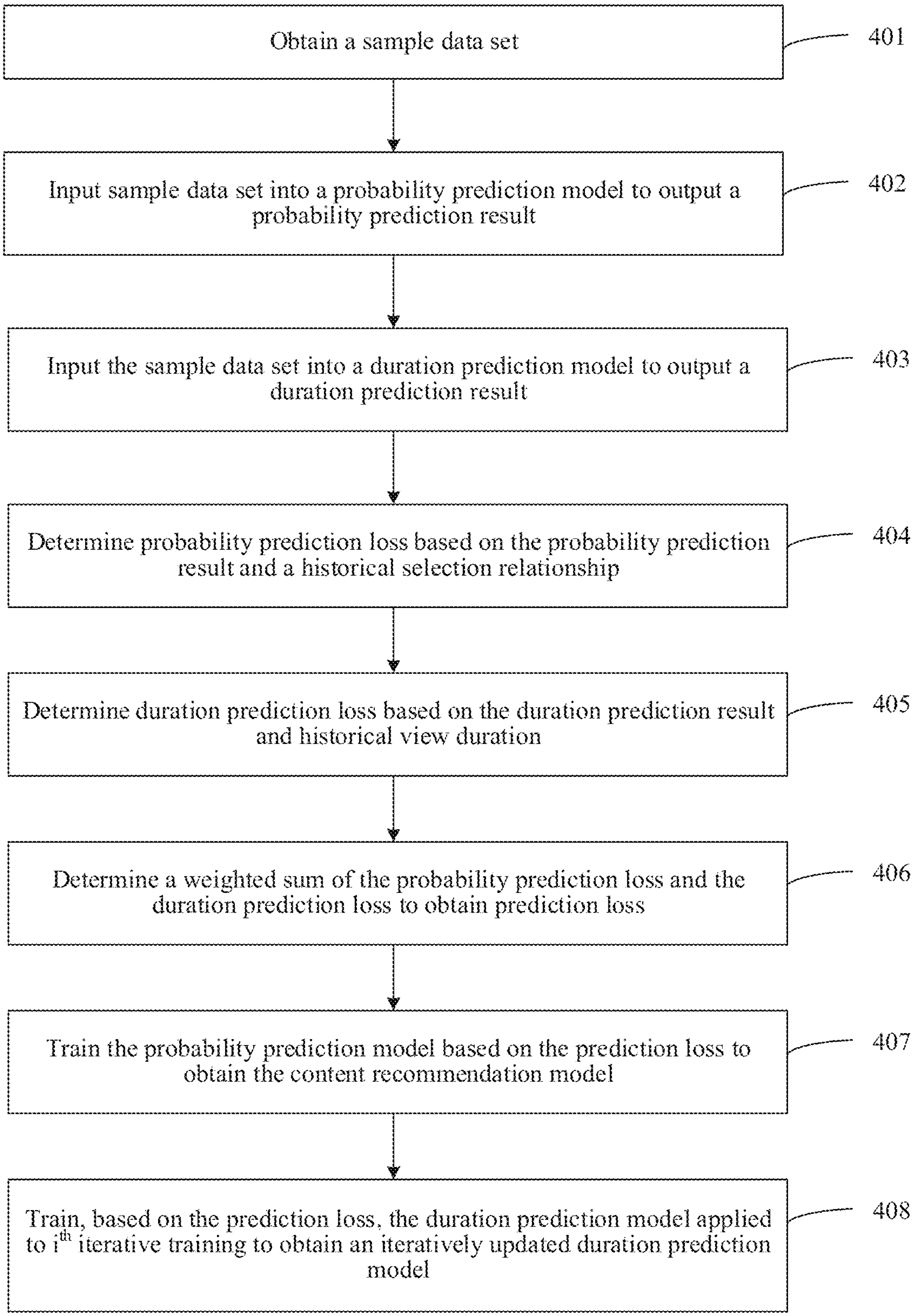
FIG. 4 is a flowchart of a method for training a content recommendation model according to another exemplary embodiment of this application.

In an embodiment, the interaction data between the historical account and the historical recommendation content includes a historical selection relationship between the historical account and the historical recommendation content, and the historical view duration of the historical recommendation content by the historical account. For example, FIG. 4 shows a flowchart of a method for training a content recommendation model according to an exemplary embodiment of this application. The method may be executed by a server or a terminal, or jointly executed by the server and the terminal. In the embodiment of this application, description is provided using an example in which the method is executed by the server. As shown in FIG. 4, the method includes the following steps:

Step 401: Obtain a sample data set.

Sample data in the sample data set includes a historical account and a historical recommendation content, and interaction data between the historical account and the historical recommendation content is labeled.

A detailed description of the sample data set in step 401 is provided in step 301, and is not repeated here.

Step 402: Input the sample data set into a probability prediction model to output a probability prediction result.

The probability prediction result is used for indicating a predicted probability of the historical account selecting the historical recommendation content.

A detailed description of the probability prediction model in step 402 is provided in step 302, and is not repeated here.

Step 403: Input the sample data set into a duration prediction model to output a duration prediction result.

The duration prediction result is used for indicating predicted duration for which the historical account views the historical recommendation content.

A detailed description of the duration prediction model in step 403 is provided in step 303, and is not repeated here.

Step 404: Determine the probability prediction loss based on the probability prediction result and the historical selection relationship.

In some embodiments, the probability prediction loss is determined based on difference between the probability prediction result and the historical selection relationship.

In some embodiments, the historical selection relationship indicates triggering of the historical recommendation content by the historical account, for example, whether the historical recommendation content is triggered by the historical account. That the historical recommendation content is not triggered indicates that the historical account does not trigger the historical recommendation content exposed and displayed on the terminal. That the historical recommendation content is triggered indicates that the historical account triggers the historical recommendation content exposed and displayed on the terminal.

In the embodiment, the probability prediction loss is calculated through a cross entropy loss function. For example, reference may be made to formula 1.

$$\text{Loss} = \sum_i^N (1 - y_i)\log(1 - f(x)) - y_i\log(f(x)). \quad \text{Formula 1}$$

$y_i$ represents the historical selection relationship between the historical account and the historical recommendation content, i.e., "successfully triggering" and "no triggering". $y_i$ is set to 1 when representing "successfully triggering", and $y_i$ is set to 0 when representing "no triggering". x represents a data feature corresponding to the sample data. A method for extracting the data feature is detailed in the following embodiments. f(x) is a function form corresponding to the probability prediction model, and is expressed as $z=f(x)\in R^C$ in a mathematical form. z is a probability prediction result. c represents a quantity of prediction classes of the probability prediction model. In the embodiment, c represents a dichotomous result set {successfully triggering, no triggering}. N represents a quantity corresponding to the probability prediction results.

Step 405: Determine the duration prediction loss based on the duration prediction result and the historical view duration.

The duration prediction loss is determined based on the difference between the duration prediction result and the historical view duration.

In some embodiments, the historical view duration is corresponding duration for which the historical account views the historical recommendation content triggered by the historical account.

In the embodiment, the duration prediction loss is determined through a mean squared loss function. For example, reference may be made to formula 2.

$$MSE = \sum_i^N (f_1(x) - \log\ (\text{duration}))^2. \quad \text{Formula 2}$$

MSE represents the duration prediction loss, $f_1(x)$ represents a function corresponding to the duration prediction model. In the embodiment, an absolute value of the duration prediction result is defined as duration, the duration prediction result is a real value, and N represents a quantity corresponding to the duration prediction result. For example, in a process of calculating the duration prediction loss, a log function for duration is taken, a log (duration) function obtained by conversion using the log function is used as a supervision target of the duration prediction model, and the duration prediction loss is calculated through a mean method.

For example, the duration prediction model uses a regression model for duration prediction analysis, or uses a classification model for duration prediction analysis. This is not limited herein. In the embodiment, the duration prediction model uses the regression model for duration prediction analysis.

Step 406: Determine a weighted sum of the probability prediction loss and the duration prediction loss to obtain the prediction loss.

In some embodiments, a product of the probability prediction loss and a probability weight parameter is determined to obtain a first weight part; a product of the duration prediction loss and a duration weight parameter is determined to obtain a second weight part; and a sum of the first weight part and the second weight part is determined as the prediction loss, the probability weight parameter and the duration weight parameter being preset parameters.

For example, referring to formula 3 for a calculation method of the prediction loss:

$$\text{Total}_{Loss}=\alpha*\text{Loss}+\beta*MSE. \quad \text{Formula 3:}$$

$\text{Total}_{Loss}$ represents the prediction loss, α represents the probability weight parameter corresponding to the probability prediction loss, β represents the duration weight parameter corresponding to the duration prediction loss. The probability weight parameter and the duration weight parameter may be adjusted depending on actual needs of the model. In the embodiment, the probability weight parameter is set to 1, and the duration weight parameter is set to 0.3.

Step 407: Train the probability prediction model based on the prediction loss to obtain the content recommendation model.

The content recommendation model is used for predicting a recommendation probability of recommending a target content to a target account.

In some embodiments, gradient adjustment is performed on model parameters of the probability prediction model based on the prediction loss to obtain the content recommendation model.

For example, when gradient adjustment is performed on the model parameters of the probability prediction model based on the prediction loss, the model parameters may be calculated through batch gradient descent (BGD), or stochastic gradient descent (SGD), or mini-batch gradient descent (Mini-BGD) to obtain update values of the parameters for updating the probability prediction model. When the prediction loss reaches a convergent state, the probability prediction model trained in this case is used as the content recommendation model, where the convergent state may be set depending on an actual situation and is not limited herein. In the embodiments, gradient adjustment is performed on the model parameters of the probability prediction model through BGD.

Step 408: Train, through the prediction loss, the duration prediction model applied to $i^{th}$ iterative training to obtain an iteratively updated duration prediction model.

The iteratively updated duration prediction model is applied to the $(i+1)^{th}$ iterative training.

For example, while the probability prediction model is trained based on the prediction loss, the duration prediction model is also trained. During the $i^{th}$ iterative training, the duration prediction model is trained to obtain the iteratively updated duration prediction model used for the $(i+1)^{th}$ training of the duration prediction model.

In some embodiments, during training the probability prediction model, iterative update is performed once on the duration prediction model for each training, or the iterative update is performed on the duration prediction model every several trainings (optional). This is not limited herein.

To sum up, the embodiments of this application provide a method for training a content recommendation model. In a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. Consequently, the method for training the content recommendation model is obtained, to improve the prediction accuracy of the probability prediction result in the model, so as to recommend more appropriate contents to the user during content marketing and improve a recommendation matching degree, thereby improving the publicity effect of recommended content.

In the embodiment, in the method of obtaining predicting loss through a weighted sum of the probability prediction loss and the duration prediction loss, the probability prediction loss and the duration prediction loss can be combined for jointly training the probability prediction model, and the prediction accuracy to the probability prediction model can be improved in combination with duration prediction.

Figure 5:
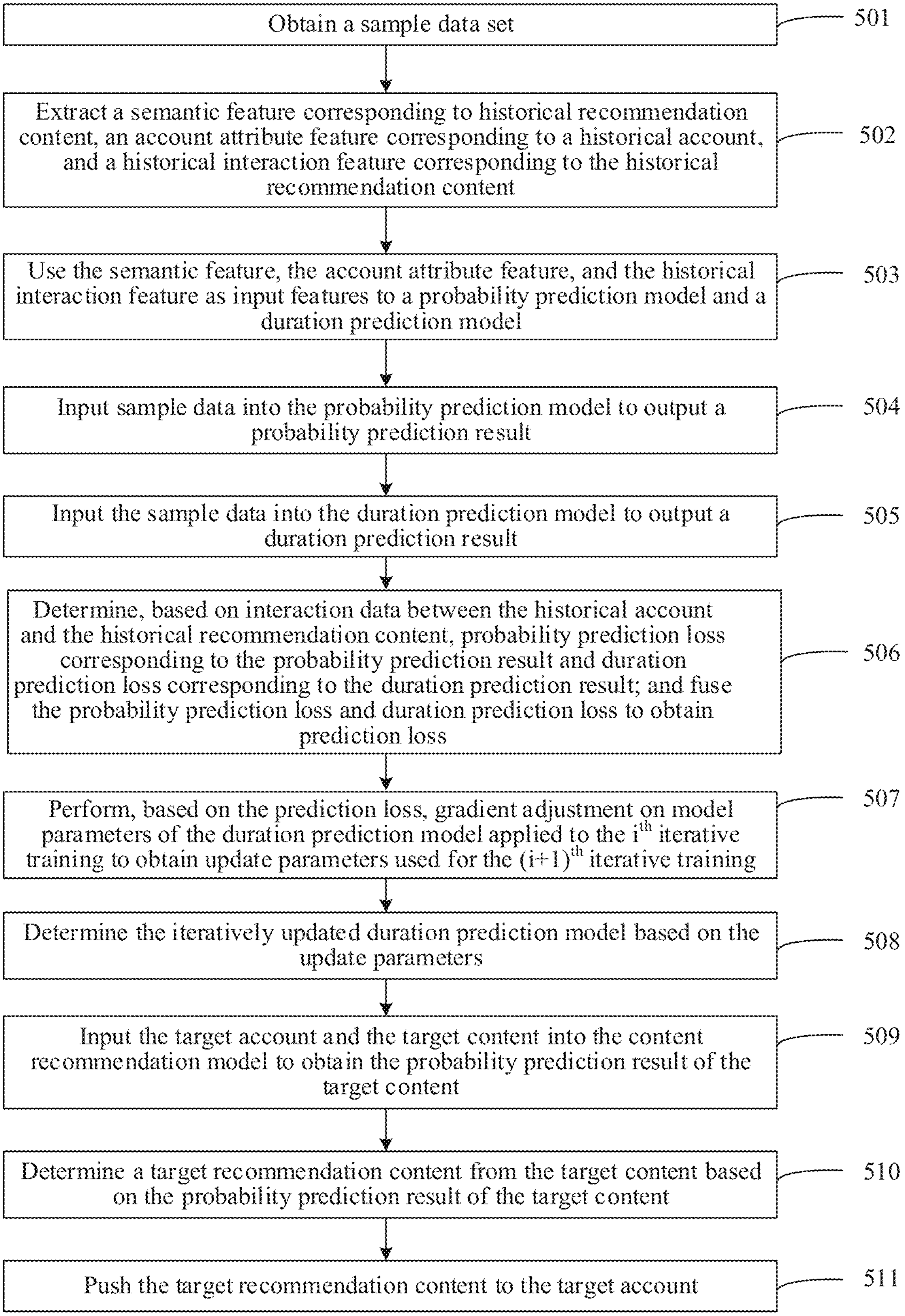
FIG. 5 is a flowchart of a method for training a content recommendation model according to another exemplary embodiment of this application.

In an embodiment, gradient adjustment is further performed on the model parameters of the duration prediction model based on the prediction loss. For example, FIG. 5 shows a flowchart of a method for training a content recommendation model according to an exemplary embodiment of this application. The method may be executed by a server or a terminal, or jointly executed by the server and the terminal. In the embodiment of this application, description is provided using an example in which the method is executed by the server. As shown in FIG. 5, the method includes the following steps:

Step 501: Obtain a sample data set.

The sample data set includes a historical account and a historical recommendation content as sample data, and interaction data between the historical account and the historical recommendation content is labeled.

A detailed description of the sample data set in step 501 is provided in step 301, and is not repeated here.

Step 502: Extract a semantic feature corresponding to the historical recommendation content, an account attribute feature corresponding to the historical account, and a historical interaction feature corresponding to the historical recommendation content.

In some embodiment, a data feature is extracted from obtained sample data, and the data feature includes at least one of the semantic feature, the account attribute feature, and the historical interaction feature.

For example, the historical recommendation content in the embodiment includes a text content. Therefore, the semantic feature is a semantic relation corresponding to the text content in the historical recommendation content. The account attribute feature is used for indicating features including user information recorded by the historical account, for example, a preference feature corresponding to user preference information. The historical interaction feature includes extracted features of the historical recommendation data corresponding to the historical recommendation content, including features indicating an interaction relationship between the historical account and the historical recommendation content, such as a historical click-through rate, historical view duration, a historical conversion rate, and is use for indicating that there is an interaction relationship between the historical account and the historical recommendation content.

Step 503: Use the semantic feature, the account attribute feature, and the historical interaction feature as input features to the probability prediction model and the duration prediction model.

In the embodiment, the probability prediction model and the duration prediction model share the semantic feature, the account attribute feature, and the historical interaction feature.

Step 504: Input the sample data into a probability prediction model to output a probability prediction result.

The probability prediction result is used for indicating a predicted probability of the historical account selecting the historical recommendation content.

Figure 6:
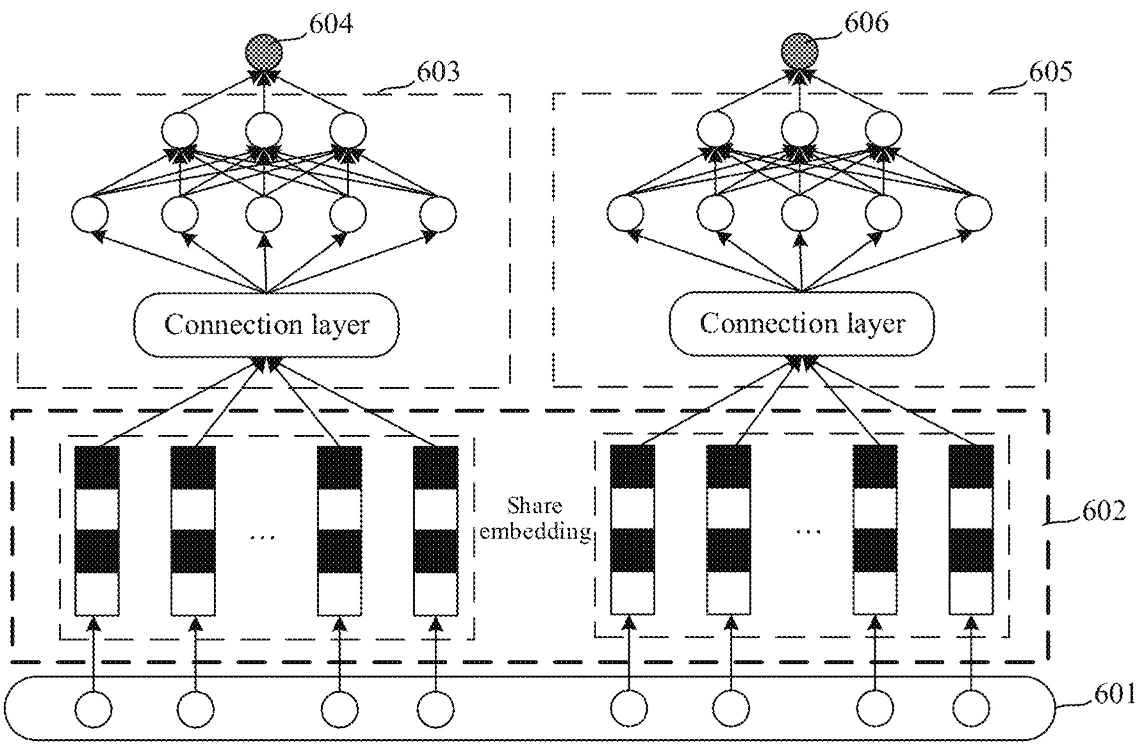
FIG. 6 is a schematic diagram of a process of joint training of a probability prediction model and a duration prediction model according to another exemplary embodiment of this application.

In some embodiments, after the semantic feature, the account attribute feature, and the historical interaction feature corresponding to the sample data are extracted as input features, it is further necessary to perform feature embedding extraction through an embedding layer. For example, FIG. 6 shows a flowchart of a joint training process of a probability prediction model and a duration prediction model according to an exemplary embodiment of this application. As shown in FIG. 6, an input feature set 601 is obtained, and the input feature set 601 includes a semantic feature, an account attribute feature, and a historical interaction feature. The input feature set 601 is inputted into an embedding layer 602 (the duration prediction model and the probability prediction model share the embedding layer), a semantic embedding feature corresponding to the semantic feature, an account attribute embedding feature corresponding to the account attribute feature, and an interaction embedding feature corresponding to the historical interaction feature are extracted, and theses embedding features are inputted into a probability prediction model 603 to output a probability prediction result 604.

Step 505: Input the sample data into a duration prediction model to output a duration prediction result.

The duration prediction result is used for indicating predicted duration for which the historical account views the historical recommendation content.

For example, the probability prediction model and the duration prediction model share the embedding layer. Therefore, the embedding features of the probability prediction model are also correspondingly inputted into the duration prediction model. As shown in FIG. 6, the semantic embedding feature corresponding to the semantic feature, the account attribute embedding feature corresponding to the account attribute feature, and the interaction embedding feature corresponding to the historical interaction feature are inputted into a duration prediction model 605 to obtain a duration prediction result 606.

Step 506: Determine, based on the interaction data between the historical account and the historical recommendation content, probability prediction loss corresponding to the probability prediction result and duration prediction loss corresponding to the duration prediction result, and fuse to obtain the prediction loss.

The method for determining the prediction loss in step 506 is described in detail in step 404 to step 406, and is not repeated here.

Step 507: Perform, based on the prediction loss, gradient adjustment on model parameters of the duration prediction model applied to the $i^{th}$ iterative training to obtain update parameters used for the $(i+1)^{th}$ iterative training.

For example, when gradient adjustment is performed on model parameters of the duration prediction model applied to the $i^{th}$ iterative training based on the prediction loss obtained by the $i^{th}$ iterative training, the model parameters may be calculated through batch gradient descent (BGD), or stochastic gradient descent (SGD), or mini-batch gradient descent (Mini-BGD) to obtain the update parameters used for the $(i+1)^{th}$ iterative training. The update parameters are parameters applied to the duration prediction model during the $(i+1)^{th}$ iterative training. This is not limited herein. In the embodiments, gradient adjustment is performed through BGD on the model parameters of the duration prediction model applied to the $i^{th}$ iterative training.

Step 508: Determine the iteratively updated duration prediction model based on the update parameters.

In some embodiments, update data distribution corresponding to the update parameters is determined; and the iteratively updated duration prediction model is determined based on a correspondence between historical data distribution and the update data distribution.

Figure 7:
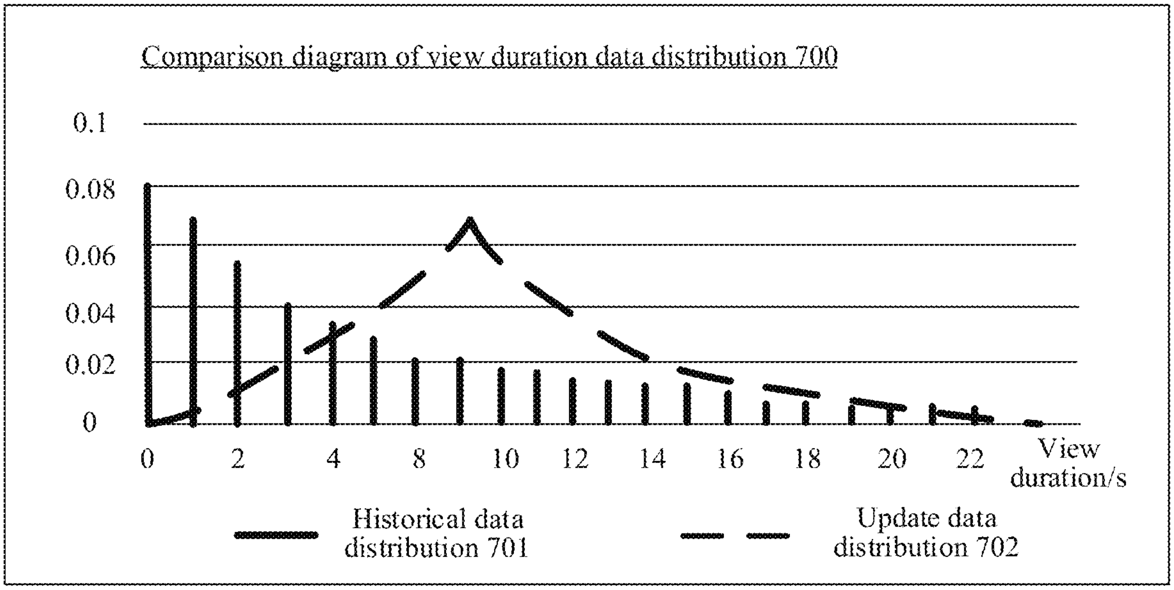
FIG. 7 is a comparison diagram of view duration data distribution according to an exemplary embodiment of this application.

For example, the historical data distribution is a distribution result corresponding to the historical view duration for which the historical account views the historical recommendation content, and the update data distribution is a data distribution result corresponding to the duration prediction result corresponding to the duration prediction model used for the $(i+1)^{th}$ iterative training. In some embodiments, FIG. 7 shows a comparison diagram 700 of view duration data distribution according to an exemplary embodiment of this application. As shown in FIG. 7, FIG. 7 includes historical data distribution 701 corresponding to a historical view record, and update data distribution 702 corresponding to the duration prediction result used in the $(i+1)^{th}$ iterative training. As can be learned from FIG. 7, the distribution result of the historical view record is logarithmic distribution. Therefore, using a regression model as the duration prediction model can make an output result be in normal distribution, so that the update data distribution 702 of the normal distribution and the historical data distribution 701 of the logarithmic distribution can be better fitted, thereby improving the training effect of the duration prediction model.

In some embodiments, when the historical data distribution and the update data distribution can be fully fitted, or when a fitting threshold is set, when a fitting degree between the historical data distribution and the update data distribution reaches the fitting threshold, the iteratively update duration prediction model is determined.

Step 509: Input a target account and a target content into the content recommendation model to obtain the probability prediction result of the target content.

In some embodiments, during application of the content recommendation model, the server includes a content recommendation set, and the content recommendation set includes a plurality of target contents. When a target user logs in to an account on the terminal and runs an application, the server obtains the target account corresponding to the target user. The target account and the target content in the content recommendation set are inputted into the content recommendation model to output the probability prediction result corresponding to the target content, where the probability prediction result is used for indicating a predicted probability of the target user triggering the target content.

Step 510: Determine a target recommendation content from the target content based on the probability prediction result of the target content.

For example, after the probability prediction result corresponding to at least one target content is obtained, eCPM is calculated based on the probability prediction result, and ranking is performed based on a calculation result, to determine the target recommendation content for content recommendation to the target account. The content recommendation includes at least one of text content recommendation, video content recommendation, audio content recommendation, or image content recommendation. This is not limited herein.

Step 511: Push the target recommendation content to the target account.

Based on the target recommendation content determined in step 510, the target recommendation content is pushed to the target account, where a pushing method includes pushing in the form of text, an image, a video, or an audio. This is not limited herein.

To sum up, the embodiments of this application provide a method for training a content recommendation model. In a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. Consequently, the method for training the content recommendation model is obtained, to improve the prediction accuracy of the probability prediction result in the model, so as to recommend more appropriate contents to the user during content marketing and improve a recommendation matching degree, thereby improving the publicity effect of recommended content.

In the embodiment, data features corresponding to sample data are extracted, and the data features are inputted into the embedding layer to extract the embedding features, to enable the probability prediction model and the duration prediction model to share the inputted embedding features, so that the probability prediction result and the duration prediction result are more correlated, and the duration prediction model and the probability prediction model can be jointly optimized based on the prediction loss, thereby improving the measurement accuracy to the content recommendation model.

Figure 8:
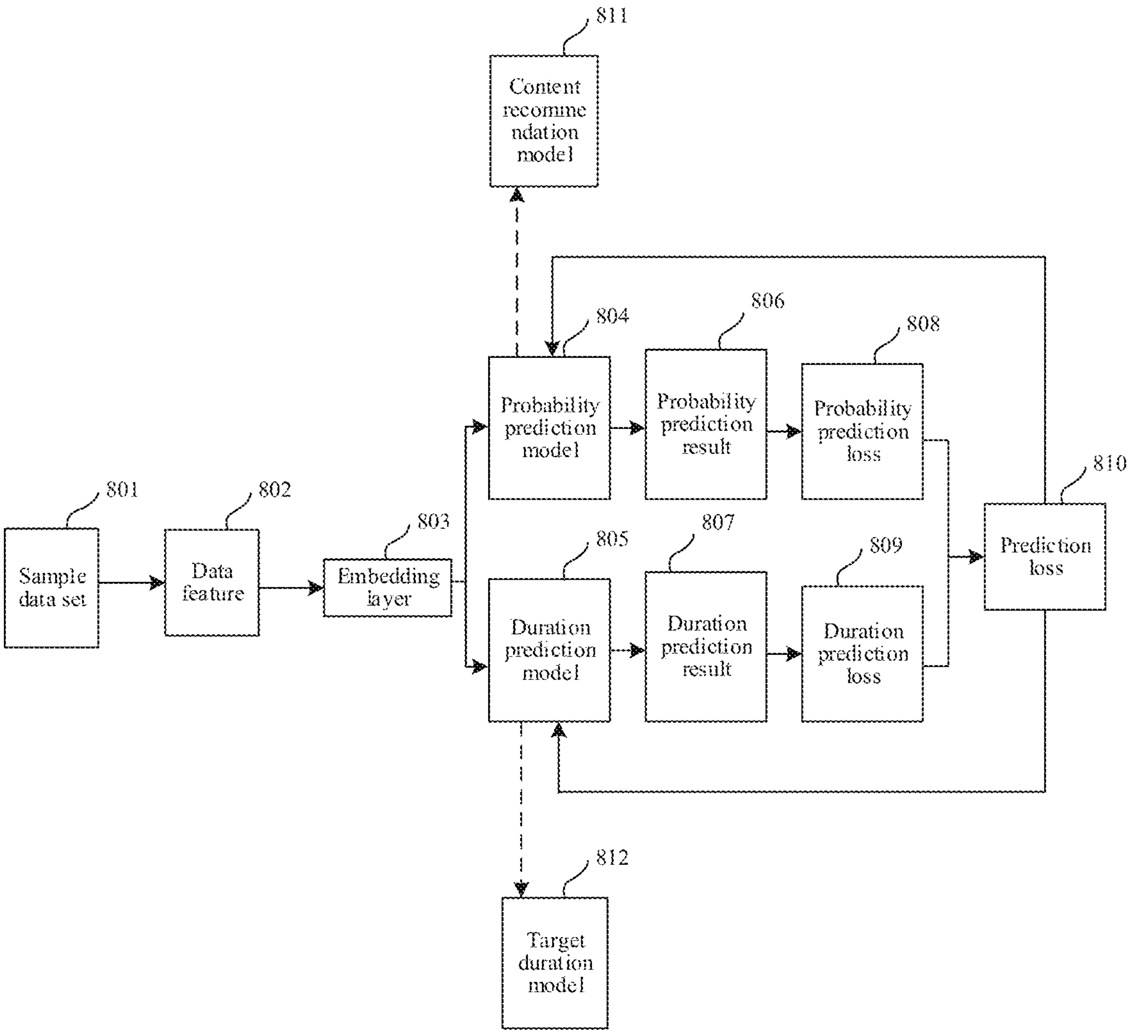
FIG. 8 is a flowchart of a method for training a content recommendation model according to an exemplary embodiment of this application.

In an embodiment, for example, FIG. 8 shows a flowchart of a method for training a content recommendation model according to an exemplary embodiment of this application. As shown in FIG. 8, description is provided using an example in which a content is a content included in an advertisement. Data features 802 corresponding to sample data in a sample data set 801 are extracted. The sample data set 801 includes sample data corresponding to a historical account and a historical recommendation content as well as labeled interaction data between the historical account and the historical recommendation content. The interaction data includes a historical selection relationship and historical view duration, etc. The data features 802 include a semantic feature, an account attribute feature, and a historical interaction feature. The data features 802 are inputted into an embedding layer 803 for extracting embedding corresponding to the data features 802. The embedding is separately inputted into a probability prediction model 804 and a duration prediction model 805 to obtain a corresponding probability prediction result 806 and a duration prediction result 807, respectively. Probability prediction loss 808 is determined based on the probability prediction result 806 and a historical selection relationship (which is not shown in the figure). Duration prediction loss 809 is determined based on the duration prediction result 807 and historical view duration (which is not shown in the figure). A weighted sum of the probability prediction loss 808 and the duration prediction loss 809 is calculated to obtain prediction loss 810. The probability prediction model 804 and the duration prediction model 805 are trained based on the prediction loss 810, respectively, to obtain a content recommendation model 811 and a target duration model 812.

Figure 9:
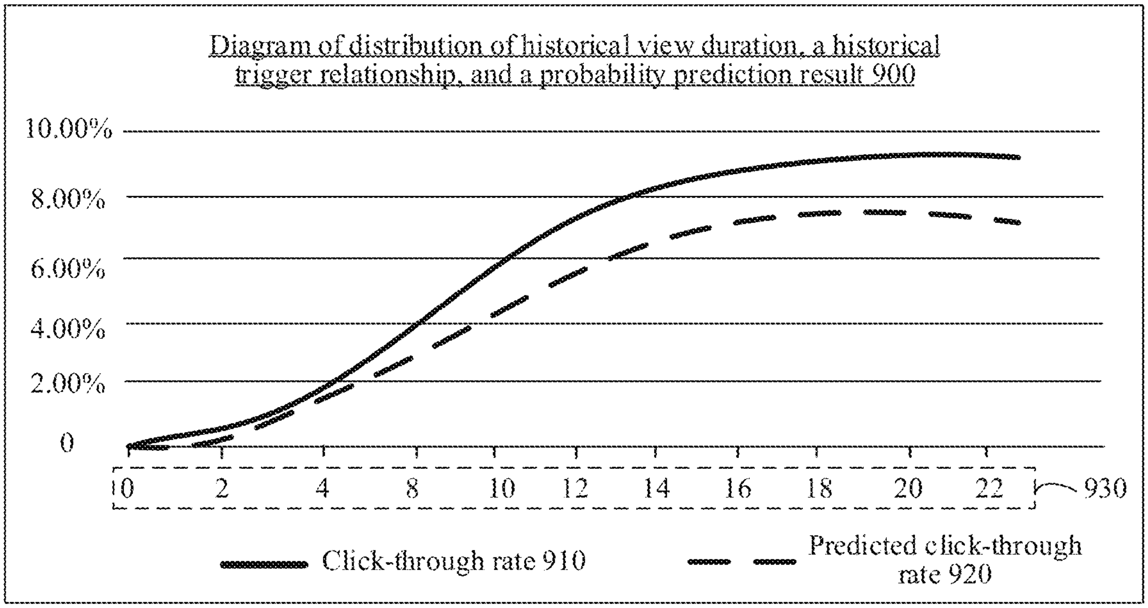
FIG. 9 is a schematic diagram of distribution of historical view duration, a click-through rate, and a predicted click-through rate according to another exemplary embodiment of this application.

On a training side, to prove that it is meaningful to establish a duration prediction model, in a scenario of advertisement content recommendation, for example, FIG. 9 shows a schematic diagram of distribution of historical view duration, a click-through rate, and a predicted click-through rate according to an exemplary embodiment of this application. As shown in FIG. 9, a historical selection relationship corresponds to a click-through rate 910 (which may be understood as a label), a probability prediction result corresponds to a predicted click-through rate 920 (which is a prediction result in the related art). As can be learned from FIG. 9, as historical view duration 930 increases, the click-through rate 910 increases significantly, indicating that the longer a user views an advertisement, the more interested the user is in an advertisement content. In addition, as can be further learned from FIG. 9 that with the increase of historical view duration 930, the predicted click-through rate 920 also increases significantly, but the increase of the predicted click-through rate 920 is inconsistent with the increase of the click-through rate 910, and the increase of the predicted click-through rate 920 is less than the increase of the click-through rate 910 with the gradual increase of the historical view duration 930. In other words, in the related art, a bias gradually increases when probability prediction for advertisement content recommendation relies only on the predicted click-through rate 920, and the model accuracy is low. Therefore, in this application, the joint training of the duration prediction model and the probability prediction model is introduced, and the content recommendation model is jointly optimized, so as to improve the accuracy of the probability prediction result by introducing the historical view duration.

On an application side, taking the scenario of advertisement content recommendation as an example, an advertiser uses a target of delivery (such as a user) as an optimization target during advertisement delivery. To obtain a conversion rate of a corresponding target, the advertiser bids accordingly. In this application, when a user performs advertisement retrieval, a prediction result corresponding to a candidate advertisement in a candidate advertisement set is obtained through the content recommendation model and a conversion rate prediction model (which is a trained model for conversion rate prediction and evaluation). Based on the prediction result, the candidate advertisement is ranked, and the candidate advertisement is fed back to the user depending on actual needs according to the ranking. The prediction result corresponding to the candidate advertisement is generally obtained by calculating real-time cost per mille of the candidate advertisement, that is:

$$eCPM=\text{Bid}\times pCTR\times pCVR.$$

pCTR refers to the predicted click-through rate (i.e., a probability prediction result outputted by the content recommendation model correspondingly), and pCVR refers to the predicted conversion rate (i.e., a conversion rate prediction result outputted by the conversion rate prediction model correspondingly).

To sum up, the embodiments of this application provide a method for training a content recommendation model. In a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. Consequently, the method for training the content recommendation model is obtained, to improve the prediction accuracy of the probability prediction result in the model, so as to recommend more appropriate contents to the user during content marketing and improve a recommendation matching degree, thereby improving the publicity effect of recommended content.

In the embodiment, this application proposes a method for introducing the historical view duration into the probability prediction model for modeling. The probability prediction result and the duration prediction result are jointly modeled by means of joint modeling during optimizing a model; In addition, during processing the historical view duration, the logarithmic distribution is converted into the normal distribution, so that a fitting result of the duration prediction model is consistent with the historical view duration. In this application, the probability prediction result is optimized based on a form of multi-objective joint modeling to improve the accuracy of the probability prediction result and reduce the deviation of the probability prediction result, so as to maximize benefits brought by the content recommendation during recommending a content.

Figure 10:
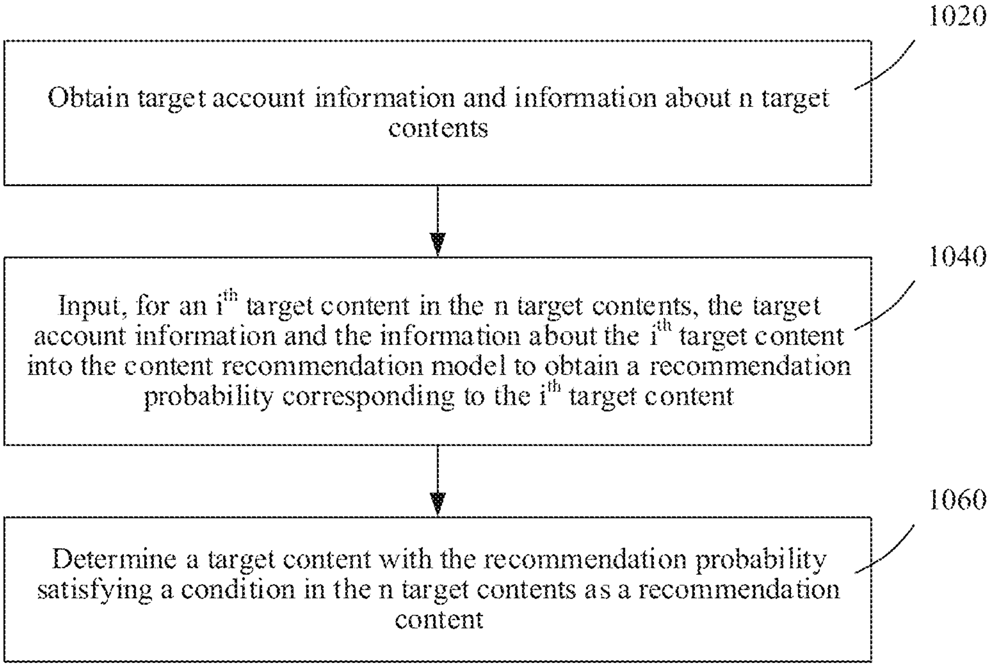
FIG. 10 is a flowchart of a content recommendation method according to an exemplary embodiment of this application.

FIG. 10 shows a flowchart of a content recommendation method according to an exemplary embodiment of this application. The method may be executed by a server or a terminal, or jointly executed by the server and the terminal. In the following embodiment, description is provided by using an example in which the method is executed by the server. The method includes:

Step 1020: Obtain target account information and information about n target contents.

n is a positive integer.

The target account information refers to information about the target account, such as registration time, registration duration, a registration location, a name, and the like of the target account; and/or the target account information refers to information about a target user corresponding to the target account, such as age, gender, preferences, a location, education, or the like of the user. A type and a quantity of the target account information are not limited in this application.

The information about the target content refers to information related to the target content, such as the identifier (ID) of the target content, content information of the target content, and historical recommendation data of the target content. A type and a quantity of the information about the target content are not limited in this application.

The content information of the target content refers to actual content of the target content. In one embodiment, the actual content of the target content is displayed in at least one of the following forms:

1. a text form, indicating displaying on the terminal in the text form when the content is recommended and displayed to the user;
2. a video form, indicating displaying on the terminal in the video form when the content is recommended and displayed to the user;
3. an audio form, indicating displaying on the terminal in the audio form when the content is recommended and displayed to the user; and
4. an image form, indicating displaying on the terminal in the image form when the content is recommended and displayed to the user.

The historical recommendation data of the target content refers to historical recommendation information of the target content. In one embodiment, the historical recommendation information of the target content includes at least one of the following information:

1. A historical exposure rate of the target content, that is, the number of times the target content is recommended and displayed on terminals of one or more users;
2. A historical click-through rate of the target content, that is, triggering of the target content by the user when the target content is recommended and displayed on terminals of one or more users;
3. A historical conversion rate of the target content, that is, a probability of a user performing subsequent operations based on the target content recommended and displayed on terminals of one or more users, for example, the target content is used for recommending a product, and the user purchases the product after viewing the target content on the terminal;
4. Historical view duration distribution of the target content, that is, time distribution of a specific content displayed after a user triggers the target content when the target content is recommended and displayed on terminals of one or more users.

Step 1040: Input, for an $i^{th}$ target content in the n target contents, the target account information and the information about the $i^{th}$ target content into the content recommendation model to obtain a recommendation probability corresponding to the $i^{th}$ target content.

For the $i^{th}$ target content, after the target account information and the information about the $i^{th}$ target content are inputted into a pre-trained content recommendation model, the content recommendation model outputs a recommendation probability corresponding to the $i^{th}$ target content.

Refer to the descriptions above for the detailed training process of the content recommendation model, which is not repeated here.

Step 1060: Determine a target content with the recommendation probability satisfying a condition in the n target contents as a recommendation content.

The recommendation content refers to a content recommended to the target account.

After the target account information and the information about n target contents are inputted into the content recommendation model, the content recommendation model outputs n recommendation probabilities corresponding to n target contents. In one embodiment, the n recommendation probabilities are ranked in a descending order, and the target content corresponding to a recommendation probability that exceeds a threshold is determined as the recommendation content.

In another embodiment, a target content in the n target contents having a recommendation probability greater than the threshold is determined as the recommendation content.

To sum up, the content recommendation model obtained by the foregoing training can predict the recommendation probability corresponding to the target content, and then whether to recommend the target content to the target account is determined. A specific content recommendation method is provided.

Figure 11:
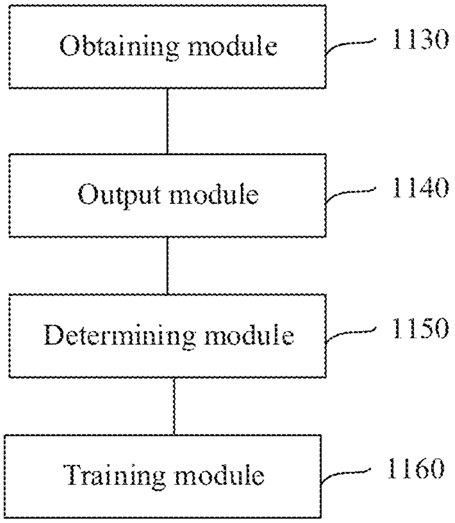
FIG. 11 is a block diagram of a structure of an apparatus for training a content recommendation model according to an exemplary embodiment of this application.

FIG. 11 is a block diagram of a structure of an apparatus for training a content recommendation model according to an exemplary embodiment of this application. As shown in FIG. 11, the apparatus includes the following parts:

- an obtaining module 1130, configured to obtain a sample data set, sample data in the sample data set including a historical account and a historical recommendation content, and interaction data between the historical account and the historical recommendation content being labeled;
- an output module 1140, configured to input the sample data into a probability prediction model to output a probability prediction result, the probability prediction result being used for indicating a predicted probability of the historical account selecting the historical recommendation content;
- the output module 1140 being further configured to input the sample data into a duration prediction model to output a duration prediction result, and the duration prediction result being used for indicating predicted duration for which the historical account views the historical recommendation content;
- a determining module 1150, configured to determine, based on the interaction data between the historical account and the historical recommendation content, probability prediction loss corresponding to the probability prediction result and duration prediction loss corresponding to the duration prediction result; and fuse the probability prediction loss and duration prediction loss to obtain prediction loss; and
- a training module 1160, configured to train the probability prediction model based on the prediction loss to obtain the content recommendation model, the content recommendation model being used for predicting a recommendation probability of recommending a target content to a target account.

In an embodiment, the interaction data between the historical account and the historical recommendation content includes a historical selection relationship between the historical account and the historical recommendation content, and historical view duration of the historical recommendation content by the historical account.

The determining module 1150 is further configured to determine the probability prediction loss based on the probability prediction result and the historical selection relationship; determine the duration prediction loss based on the duration prediction result and the historical view duration; and determine a weighted sum of the probability prediction loss and the duration prediction loss to obtain the prediction loss.

The determining module 1150 is further configured to determine a product of the probability prediction loss and a probability weight parameter to obtain a first weight part; a product of the duration prediction loss and a duration weight parameter is determined to obtain a second weight part; and a sum of the first weight part and the second weight part is determined as the prediction loss, the probability weight parameter and the duration weight parameter being preset parameters.

The determining module 1150 is further configured to determine the probability prediction loss based on difference between the probability prediction result and the historical selection relationship.

The determining module 1150 is further configured to determine the duration prediction loss based on difference between the duration prediction result and the historical view duration.

Figure 12:
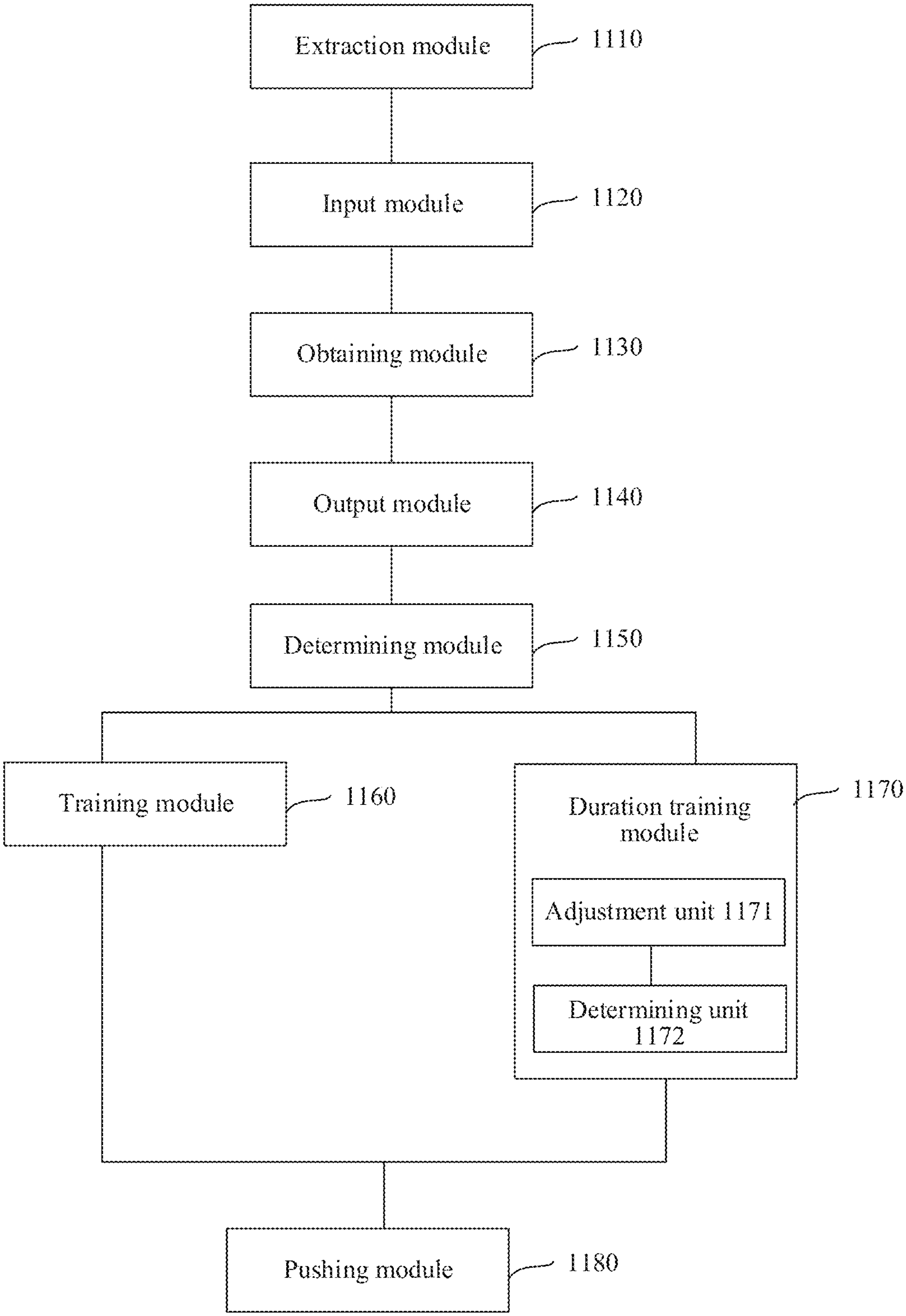
FIG. 12 is a block diagram of a structure of an apparatus for training a content recommendation model according to another exemplary embodiment of this application.

In an embodiment, with reference to FIG. 12, the apparatus further includes:

- an extraction module 1110, configured to extract a semantic feature corresponding to the historical recommendation content, an account attribute feature corresponding to the historical account, and a historical interaction feature corresponding to the historical recommendation content;
- an input module 1120, configured to take the semantic feature, the account attribute feature, and the historical interaction feature as input features to the probability prediction model and the duration prediction model.

In an embodiment, the training module 1160 is further configured to perform, based on the prediction loss, gradient adjustment on model parameters of the probability prediction model to obtain the content recommendation model.

In an embodiment, the apparatus further includes:

- a duration training module 1170, configured to train, through the prediction loss, the duration prediction model applied to $i^{th}$ iterative training to obtain an iteratively updated duration prediction model, the iteratively updated duration prediction model being applied to $(i+1)^{th}$ iterative training.

In an embodiment, the duration training module 1170 further includes:

- an adjustment unit 1171, configured to perform, based on the prediction loss, gradient adjustment on model parameters of the duration prediction model applied to the $i^{th}$ iterative training to obtain update parameters used for the $(i+1)^{th}$ iterative training; and
- a determining unit 1172, configured to determine the iteratively updated duration prediction model based on the update parameters.

In an embodiment, the determining unit 1172 is further configured to determine update data distribution corresponding to the update parameters; and the iteratively updated duration prediction model is determined based on a correspondence between historical data distribution and the update data distribution.

In an embodiment, a type of the duration prediction model is a regression model, the historical data distribution presents a logarithmic distribution pattern, and the update data distribution presents a normal distribution pattern. The determining unit 1172 is further configured to determine the iteratively updated duration prediction model on the basis that the logarithmic distribution pattern of the historical data distribution and the normal distribution pattern of the update data distribution satisfies a fitting condition.

In an embodiment, the apparatus further includes:

the output module 1140, further configured to input the target account and the target content into the content recommendation model to obtain the probability prediction result of the target content;

the determining module 1150, further configured to determine a target recommendation content from the target content based on the probability prediction result of the target content; and a pushing module 1180, configured to push the target recommendation content to the target account.

To sum up, in the content recommendation apparatus provided in the embodiment of this application, in a process of training the content recommendation model, the duration prediction model is used based on the probability prediction model for joint training. During training the probability prediction model with the assistance of the duration prediction model, the historical account and the historical recommendation content in the sample data set are used as sample data, and the sample data is inputted into both the duration prediction model and the probability prediction model, to obtain a corresponding duration prediction result and probability prediction result, and the duration prediction loss and the probability prediction loss are determined based on the two results. Then, the probability prediction model is trained using the prediction loss obtained by the fusion of the duration prediction loss and the probability prediction loss, to train the probability prediction model with the assistance of the duration prediction model, thereby achieving the objective of joint training. Consequently, the method for training the content recommendation model is obtained, to improve the prediction accuracy of the probability prediction result in the model, so as to recommend more appropriate contents to the user during content marketing and improve a recommendation matching degree, thereby improving the publicity effect of recommended content.

Figure 13:
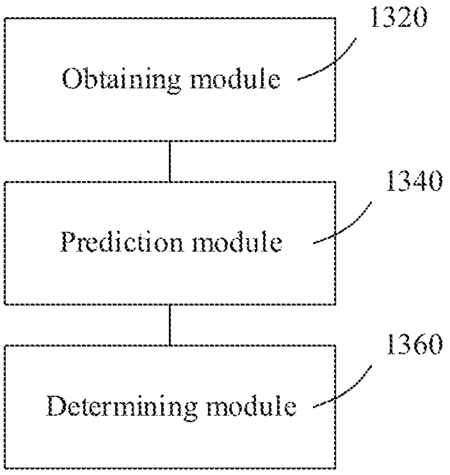
FIG. 13 is a block diagram of a structure of a content recommendation apparatus according to an exemplary embodiment of this application.

FIG. 13 is a block diagram of a structure of a content recommendation apparatus according to an exemplary embodiment of this application. The apparatus includes:

an obtaining module 1320, configured to obtain target account information and information about n target contents, n being a positive integer;

a prediction module 1340, configured to input, for an $i^{th}$ target content in the n target contents, the target account information and the information about the $i^{th}$ target content into the content recommendation model to obtain a recommendation probability corresponding to the $i^{th}$ target content; and a determining module 1360, configured to determine a target content with the recommendation probability satisfying a condition in the n target contents as a recommendation content.

For the apparatus for training the content recommendation model provided in the foregoing embodiment, division of the functional modules above is merely used as an example for description. In actual application, the functions above are allocated to different functional modules according to requirements, that is, an internal structure of the device is divided into different functional modules, so as to complete all or some of the functions above. In addition, the apparatus for training the content recommendation model provided in the foregoing embodiment belongs to the same conception as the embodiment of the method for training a content recommendation model. Refer to the method embodiment for details of the specific implementation process, which is not described herein again.

Figure 14:
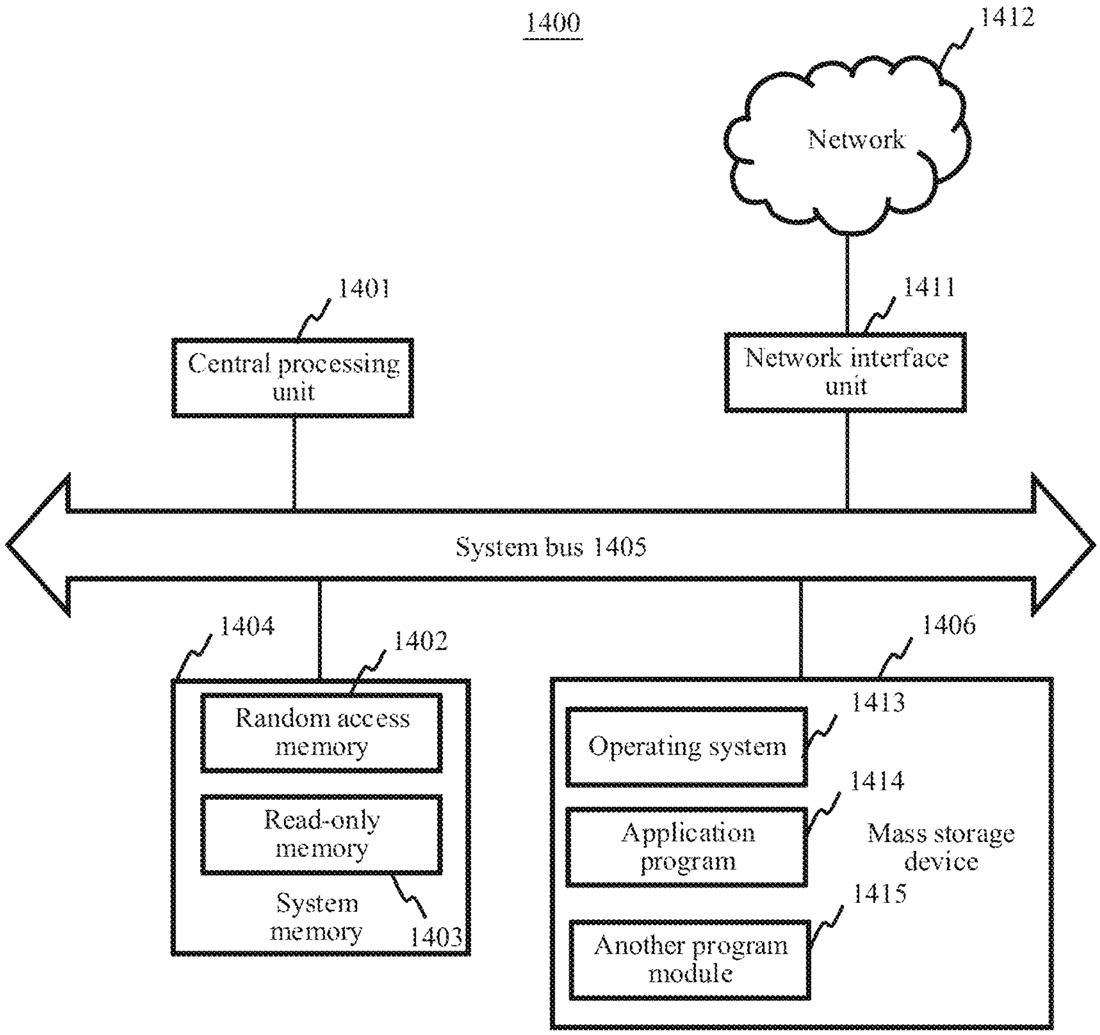
FIG. 14 is a schematic structural diagram of a server according to an exemplary embodiment of this application.

FIG. 14 shows a schematic structural diagram of a server according to an embodiment of this application. The server may be the server shown in FIG. 2.

Specifically, as follows: The server 1400 includes a central processing unit (CPU) 1401, a system memory 1404 including a random access memory (RAM) 1402 and a read-only memory (ROM) 1403, and a system bus 1405 connecting the system memory 1404 and the CPU 1401. The server 1400 further includes a mass storage device 1406 configured to store an operating system 1413, an application program 1414, and another program module 1415.

The mass storage device 1406 is connected to the CPU 1401 by using a mass storage controller (not shown) connected to the system bus 1405. The mass storage device 1406 and a computer readable medium associated with the mass storage device provide non-volatile storage for the server 1400. That is, the mass storage device 1406 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can know that the computer storage medium is not limited to the foregoing several types. The system memory 1404 and the mass storage device 1406 may be collectively referred to as a memory.

According to various embodiments of this application, the server 1400 may further be connected, by using a network such as the Internet, to a remote computer on the network and run. That is, the server 1400 may be connected to a network 1412 by using a network interface unit 1411 that is connected to the system bus 1405, or may be connected to a network of another type or a remote computer system (not shown) by using the network interface unit 1411.

The memory further includes one or more programs, which are stored in the memory and are configured to be executed by the CPU.

An embodiment of this application further provides a computer device. The computer device may be implemented as the terminal or the server shown in FIG. 2. The computer device includes a processor and a memory. The memory stores at least one instruction, at least one program, a code set or an instruction set. The at least one instruction, the at least one program, the code set or the instruction set is loaded and executed by the processor to implement the method for training a content recommendation model or the content recommendation method provided in the foregoing method embodiments.

An embodiment of this application further provides a computer-readable storage medium having at least one instruction, at least one program, a code set or an instruction set stored thereon. The at least one instruction, the at least one program, the code set or the instruction set is loaded and executed by the processor to implement the method for training a content recommendation model or the content recommendation method provided in the foregoing method embodiments.

The embodiments of this application further provide a computer program product or a computer program. The computer program product or the computer program includes computer instructions stored in a computer-readable storage medium. The processor of the computer device reads the computer instructions from the computer-readable storage medium, and the processor executes the computer instructions, so that the computer device executes the method for training a content recommendation model and the content recommendation method according to any one of the foregoing embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The serial numbers of the foregoing embodiments of this application are merely for the purpose of description, and do not represent the merits of the embodiments.

In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module that includes the functionalities of the module or unit. The foregoing is merely exemplary embodiments of this application, but is not intended to limit this application. Any modification, equivalent replacement, or improvement made within the spirit and principle of this application shall fall within the scope of protection of this application.

What is claimed is:

1. A method for training a content recommendation model, comprising:

obtaining a sample data set, the sample data set comprising a historical account and a historical recommendation content, and interaction data between the historical account and the historical recommendation content being labeled;

extracting a set of embedding features from the sample data set using an embedding layer;

inputting the set of embedding features into a probability prediction model to output a probability prediction result, the probability prediction result indicating a predicted probability of the historical account selecting the historical recommendation content;

inputting the set of embedding features into a duration prediction model to output a duration prediction result, the duration prediction result indicating predicted duration for which the historical account views the historical recommendation content;

determining probability prediction loss corresponding to the probability prediction result and duration prediction loss corresponding to the duration prediction result; and jointly training the probability prediction model and the duration prediction model by optimizing a total prediction loss, wherein the total prediction loss is based on a weighted sum of the probability prediction loss and the duration prediction loss to obtain the content recommendation model, the content recommendation model predicting a recommendation probability of recommending a target content to a target account.

2. The method according to claim 1, wherein the interaction data between the historical account and the historical recommendation content comprises a historical selection relationship between the historical account and the historical recommendation content, and historical view duration of the historical recommendation content by the historical account; and the determining probability prediction loss corresponding to the probability prediction result and duration prediction loss corresponding to the duration prediction result comprise:

determining the probability prediction loss based on the probability prediction result and the historical selection relationship;

determining the duration prediction loss based on the duration prediction result and the historical view duration; and determining the weighted sum of the probability prediction loss and the duration prediction loss to obtain the total prediction loss.

3. The method according to claim 2, wherein the determining the weighted sum of the probability prediction loss and the duration prediction loss to obtain the total prediction loss comprises:

determining a product of the probability prediction loss and a probability weight parameter to obtain a first weight part;

determining a product of the duration prediction loss and a duration weight parameter to obtain a second weight part; and determining a sum of the first weight part and the second weight part as the total prediction loss, the probability weight parameter and the duration weight parameter being preset parameters.

4. The method according to claim 1, wherein before the inputting the sample data into a probability prediction model, the method further comprises:

extracting a semantic embedding feature corresponding to the historical recommendation content, an account attribute embedding feature corresponding to the historical account, and a historical interaction embedding feature corresponding to the historical recommendation content, the semantic embedding feature, the account attribute embedding feature, and the historical interaction embedding feature being used as the set of embedding features input to the probability prediction model and the duration prediction model, respectively.

5. The method according to claim 1, wherein the jointly training the probability prediction model and the duration prediction model based on the prediction loss to obtain the content recommendation model comprises:

performing, based on the total prediction loss, gradient adjustment on model parameters of the probability prediction model and the duration prediction model to obtain the content recommendation model.

6. The method according to claim 1, wherein the method further comprises:

training, through the total prediction loss, the duration prediction model applied to ith iterative training to obtain an iteratively updated duration prediction model, the iteratively updated duration prediction model being applied to $(i+1)^{th}$ iterative training.

7. The method according to claim 1, wherein after the jointly training the probability prediction model and the duration prediction model based on the prediction loss to obtain the content recommendation model, the method further comprises:

inputting the target account and the target content into the content recommendation model to obtain the probability prediction result of the target content;

determining a target recommendation content from the target content based on the probability prediction result of the target content; and pushing the target recommendation content to the target account.

8. A computer device, the computer device comprising a processor and a memory, the memory storing at least one instruction, and the at least one instruction being loaded and executed by the processor and causing the computer device to perform a method for training a content recommendation model including:

obtaining a sample data set, the sample data set comprising a historical account and a historical recommendation content, and interaction data between the historical account and the historical recommendation content being labeled;

extracting a set of embedding features from the sample data set using an embedding layer:

inputting the set of embedding features into a probability prediction model to output a probability prediction result, the probability prediction result indicating a predicted probability of the historical account selecting the historical recommendation content;

inputting the set of embedding features into a duration prediction model to output a duration prediction result, the duration prediction result indicating predicted duration for which the historical account views the historical recommendation content;

determining probability prediction loss corresponding to the probability prediction result and duration prediction loss corresponding to the duration prediction result; and jointly training the probability prediction model and the duration prediction model by optimizing a total prediction loss, wherein the total prediction loss is based on a weighted sum of the probability prediction loss and the duration prediction loss to obtain the content recommendation model, the content recommendation model predicting a recommendation probability of recommending a target content to a target account.

9. The computer device according to claim 8, wherein the interaction data between the historical account and the historical recommendation content comprises a historical selection relationship between the historical account and the historical recommendation content, and historical view duration of the historical recommendation content by the historical account; and the determining probability prediction loss corresponding to the probability prediction result and duration prediction loss corresponding to the duration prediction result comprise:

determining the probability prediction loss based on the probability prediction result and the historical selection relationship;

determining the duration prediction loss based on the duration prediction result and the historical view duration; and determining the weighted sum of the probability prediction loss and the duration prediction loss to obtain the total prediction loss.

10. The computer device according to claim 9, wherein the determining the weighted sum of the probability prediction loss and the duration prediction loss to obtain the total prediction loss comprises:

determining a product of the probability prediction loss and a probability weight parameter to obtain a first weight part;

determining a product of the duration prediction loss and a duration weight parameter to obtain a second weight part; and determining a sum of the first weight part and the second weight part as the total prediction loss, the probability weight parameter and the duration weight parameter being preset parameters.

11. The computer device according to claim 8, wherein before the inputting the sample data into a probability prediction model, the method further comprises:

extracting a semantic embedding feature corresponding to the historical recommendation content, an account attribute embedding feature corresponding to the historical account, and a historical interaction embedding feature corresponding to the historical recommendation content, the semantic embedding feature, the account attribute embedding feature, and the historical interaction embedding feature being used as the set of embedding features input to the probability prediction model and the duration prediction model, respectively.

12. The computer device according to claim 8, wherein the jointly training the probability prediction model and the duration prediction model based on the prediction loss to obtain the content recommendation model comprises:

performing, based on the total prediction loss, gradient adjustment on model parameters of the probability prediction model and the duration prediction model to obtain the content recommendation model.

13. The computer device according to claim 8, wherein the method further comprises:

training, through the total prediction loss, the duration prediction model applied to ith iterative training to obtain an iteratively updated duration prediction model, the iteratively updated duration prediction model being applied to $(i+1)^{th}$ iterative training.

14. The computer device according to claim 8, wherein after the jointly training the probability prediction model and the duration prediction model based on the prediction loss to obtain the content recommendation model, the method further comprises:

inputting the target account and the target content into the content recommendation model to obtain the probability prediction result of the target content;

determining a target recommendation content from the target content based on the probability prediction result of the target content; and pushing the target recommendation content to the target account.

15. A non-transitory computer-readable storage medium, the storage medium storing at least one instruction, the at least one instruction being loaded and executed by a processor of a computer device and causing the computer device to perform a method for training a content recommendation model including:

obtaining a sample data set, the sample data set comprising a historical account and a historical recommendation content, and interaction data between the historical account and the historical recommendation content being labeled;

extracting a set of embedding features from the sample data set using an embedding layer;

inputting the set of embedding features into a probability prediction model to output a probability prediction result, the probability prediction result indicating a predicted probability of the historical account selecting the historical recommendation content;

inputting the set of embedding features into a duration prediction model to output a duration prediction result, the duration prediction result indicating predicted duration for which the historical account views the historical recommendation content;

determining probability prediction loss corresponding to the probability prediction result and duration prediction loss corresponding to the duration prediction result; and jointly training the probability prediction model and the duration prediction model by optimizing a total prediction loss, wherein the total prediction loss is based on a weighted sum of the probability prediction loss and the duration prediction loss to obtain the content recommendation model, the content recommendation model predicting a recommendation probability of recommending a target content to a target account.

16. The non-transitory computer-readable storage medium according to claim 15, wherein the interaction data between the historical account and the historical recommendation content comprises a historical selection relationship between the historical account and the historical recommendation content, and historical view duration of the historical recommendation content by the historical account; and the determining probability prediction loss corresponding to the probability prediction result and duration prediction loss corresponding to the duration prediction result comprise:

determining the probability prediction loss based on the probability prediction result and the historical selection relationship;

determining the duration prediction loss based on the duration prediction result and the historical view duration; and determining the weighted sum of the probability prediction loss and the duration prediction loss to obtain the total prediction loss.

17. The non-transitory computer-readable storage medium according to claim 15, wherein the determining the weighted sum of the probability prediction loss and the duration prediction loss to obtain the total prediction loss comprises:

determining a product of the probability prediction loss and a probability weight parameter to obtain a first weight part;

determining a product of the duration prediction loss and a duration weight parameter to obtain a second weight part; and determining a sum of the first weight part and the second weight part as the total prediction loss, the probability weight parameter and the duration weight parameter being preset parameters.

18. The non-transitory computer-readable storage medium according to claim 15, wherein the jointly training the probability prediction model and the duration prediction model based on the prediction loss to obtain the content recommendation model comprises:

performing, based on the total prediction loss, gradient adjustment on model parameters of the probability prediction model and the duration prediction model to obtain the content recommendation model.

19. The non-transitory computer-readable storage medium according to claim 15, wherein the method further comprises:

training, through the total prediction loss, the duration prediction model applied to ith iterative training to obtain an iteratively updated duration prediction model, the iteratively updated duration prediction model being applied to $(i+1)^{th}$ iterative training.

20. The non-transitory computer-readable storage medium according to claim 15, wherein after the jointly training the probability prediction model and the duration prediction model based on the prediction loss to obtain the content recommendation model, the method further comprises:

inputting the target account and the target content into the content recommendation model to obtain the probability prediction result of the target content;

determining a target recommendation content from the target content based on the probability prediction result of the target content; and pushing the target recommendation content to the target account.

* * * * *